(12) United States Patent
Mosko et al.

(10) Patent No.: US 10,749,949 B2
(45) Date of Patent: Aug. 18, 2020

(54) DYNAMIC CONTENT DISTRIBUTION PROTOCOL FOR AN ENTERPRISE ENVIRONMENT

(71) Applicant: Palo Alto Research Center Incorporated, Palo Alto, CA (US)

(72) Inventors: Marc E. Mosko, Santa Cruz, CA (US); Ehsan Hemmati, Campbell, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 75 days.

(21) Appl. No.: 16/195,433

(22) Filed: Nov. 19, 2018

(65) Prior Publication Data

US 2020/0162543 A1    May 21, 2020

(51) Int. Cl.
*G06F 15/16*    (2006.01)
*H04L 29/08*    (2006.01)
*H04L 29/06*    (2006.01)

(52) U.S. Cl.
CPC .......... *H04L 67/104* (2013.01); *H04L 63/102* (2013.01); *H04L 67/42* (2013.01)

(58) Field of Classification Search
CPC ...... H04L 67/104; H04L 63/102; H04L 67/42
See application file for complete search history.

(56) References Cited

U.S. PATENT DOCUMENTS

| 8,195,910 | B2 * | 6/2012 | Zuckerman | H04L 29/08333 711/173 |
|---|---|---|---|---|
| 8,583,819 | B2 * | 11/2013 | Kim | H04L 67/1074 370/230 |
| 8,677,008 | B2 * | 3/2014 | Zuckerman | H04L 29/08333 709/232 |
| 9,210,085 | B2 * | 12/2015 | Harrison | H04L 47/10 |
| 9,213,348 | B2 * | 12/2015 | Garrett | H04L 47/2491 |
| 9,379,908 | B2 * | 6/2016 | Ramaswami | H04L 12/4641 |
| 9,736,236 | B2 * | 8/2017 | Kim | H04L 65/607 |
| 9,736,539 | B2 * | 8/2017 | Hainline | H04N 7/17318 |
| 2008/0133767 | A1 * | 6/2008 | Birrer | H04L 65/4076 709/231 |
| 2010/0241708 | A1 * | 9/2010 | Zuckerman | H04L 29/08333 709/204 |
| 2013/0111513 | A1 * | 5/2013 | Gaude | H04N 7/173 725/14 |
| 2016/0373822 | A1 * | 12/2016 | Hainline | H04N 7/17318 |
| 2018/0302470 | A1 * | 10/2018 | Swanson | G06F 16/176 |

* cited by examiner

*Primary Examiner* — Moustafa M Meky
(74) *Attorney, Agent, or Firm* — Shun Yao; Park, Vaughan, Fleming & Dowler LLP

(57) ABSTRACT

Embodiments described herein provide a system for facilitating dynamic content distribution in an enterprise environment. During operation, the system receives, from a controller of the enterprise environment, an instruction for downloading a piece of content from one or more peers of a peer-to-peer protocol. The instruction can include a file descriptor that indicates a set of blocks the piece of content is divided into. The system can receive an offer for a first block of the set of blocks from a first peer of the one or more peers and determine whether the system is in a full peer relationship with a second peer of the one or more peers. The full peer relationship indicates that the second peer and the system are clients and servers of each other. If the system is in a full peer relationship, the system elects, between the second peer and the system, a sender for a first request that responds to the first offer.

20 Claims, 15 Drawing Sheets

DYNAMIC CONTENT DISTRIBUTION PROTOCOL FOR AN ENTERPRISE ENVIRONMENT

RELATED APPLICATION

The present disclosure is related to U.S. patent application Ser. No. 16/156,565, titled "Dynamic Content Distribution in an Enterprise Network," by inventor Marc E. Mosko, filed 10 Oct. 2018; and U.S. patent application Ser. No. 16/183,547, titled "Network Measurement in an Enterprise Environment," by inventor Marc E. Mosko, filed 7 Nov. 2018, the disclosures of which are incorporated by reference herein.

BACKGROUND

Field

This disclosure is generally related to the field of content distribution. More specifically, this disclosure is related to a system and method for efficiently distributing content in an enterprise network.

Related Art

The proliferation of the Internet and e-commerce continues to create a vast amount of digital content. An enterprise or large corporation may include a network of managed devices, such as cloud storage devices and printers, distributed across multiple sites. In such a network of devices, a device manager may manage (e.g., configure and control) the devices in a local network of one of the sites. This device manager can be responsible for firmware updates, policy file distribution, or data transfers. These operations typically involve large file transfers to a large number of managed devices within the enterprise network.

A conventional device manager typically manages devices based on, e.g., a Simple Network Management Protocol (SNMP) query, which is based on the Internet Protocol (IP) addresses of the managed devices. However, each device can be assigned an IP address by a Dynamic Host Configuration Protocol (DHCP) server based on a local address pool (e.g., from a set of private IP addresses). To facilitate access to the devices in a private network, the device manager conventionally resides within the same network, such as the same private IP sub-network and the local area network (LAN). However, with large enterprises, the device manager may need to distribute large files across multiple subnets.

The device manager typically uses the existing networking framework and protocols to enable large-scale file distribution within the enterprise network. However, such solutions are directed toward topology-aware peer-to-peer content distribution solutions. These solutions estimate the network conditions between the participants to find suitable candidates for a specific file. These solutions, however, usually do not plan the distribution of a file. As a result, the file may be distributed in the network based on demand. In particular, since these solutions are for the Internet, they are designed for widely distributed participants with minimum topological correlation. Sometimes a particular file might have a flash popularity and create a temporal interest correlation, but the topological correlation remains disperse. Therefore, these solutions may not serve an enterprise environment, which can have a high degree of topological and temporal correlation for planned use, such as firmware updates or operating system patches.

SUMMARY

Embodiments described herein provide a system for facilitating dynamic content distribution in an enterprise environment. During operation, the system receives, from a controller of the enterprise environment, an instruction for downloading a piece of content from one or more peers of a peer-to-peer protocol. The instruction can include a file descriptor that indicates a set of blocks the piece of content is divided into. The system can receive an offer for a first block of the set of blocks from a first peer of the one or more peers and determine whether the system is in a full peer relationship with a second peer of the one or more peers. The full peer relationship indicates that the second peer and the system are clients and servers of each other. If the system is in a full peer relationship, the system elects, between the second peer and the system, a sender for a first request that responds to the first offer.

In a variation on this embodiment, the system sends a subscription request for the piece of content to the one or more peers based on the instruction.

In a variation on this embodiment, if the system is not in a full peer relationship, the system can determine a first priority value associated with a peer relationship with the first peer. If the first priority value is lower than a threshold, the system can back off from sending the first request for a predetermined period of time.

In a further variation, the system determines whether a second offer for the first block from a third peer has been received within the predetermined period of time and whether a second priority value of the second offer is greater than the first priority value. If the second priority value is greater than the first priority value, the system can send a second request that responds to the second offer.

In a further variation, if the system does not receive the second offer or the second priority value is not greater than the first priority value, the system can send the first request to the first peer.

In a variation on this embodiment, if the system is elected as the sender, the system sends the first request to the first peer, sends a download notification message to the second peer, and receives the first block from the first peer.

In a further variation, the system sends a third offer for the first block to the second peer. The system then sends the first block to the second peer upon receiving a third request that responds to the third offer.

In a variation on this embodiment, if the second peer is elected as the sender, the system waits for a predetermined period of time for a download notification message from the second peer.

In a further variation, the system receives a fourth offer for the first block from the second peer and sends a fourth request that responds to the fourth offer.

In a variation on this embodiment, the system determines whether the first peer is authorized to send an offer for the first block based on the file descriptor and an authorizations table. The authorizations table maintains permissions for operations and resources of the enterprise environment.

BRIEF DESCRIPTION OF THE FIGURES

In the figures, like reference numerals refer to the same figure elements.

DETAILED DESCRIPTION

Figure 1A:
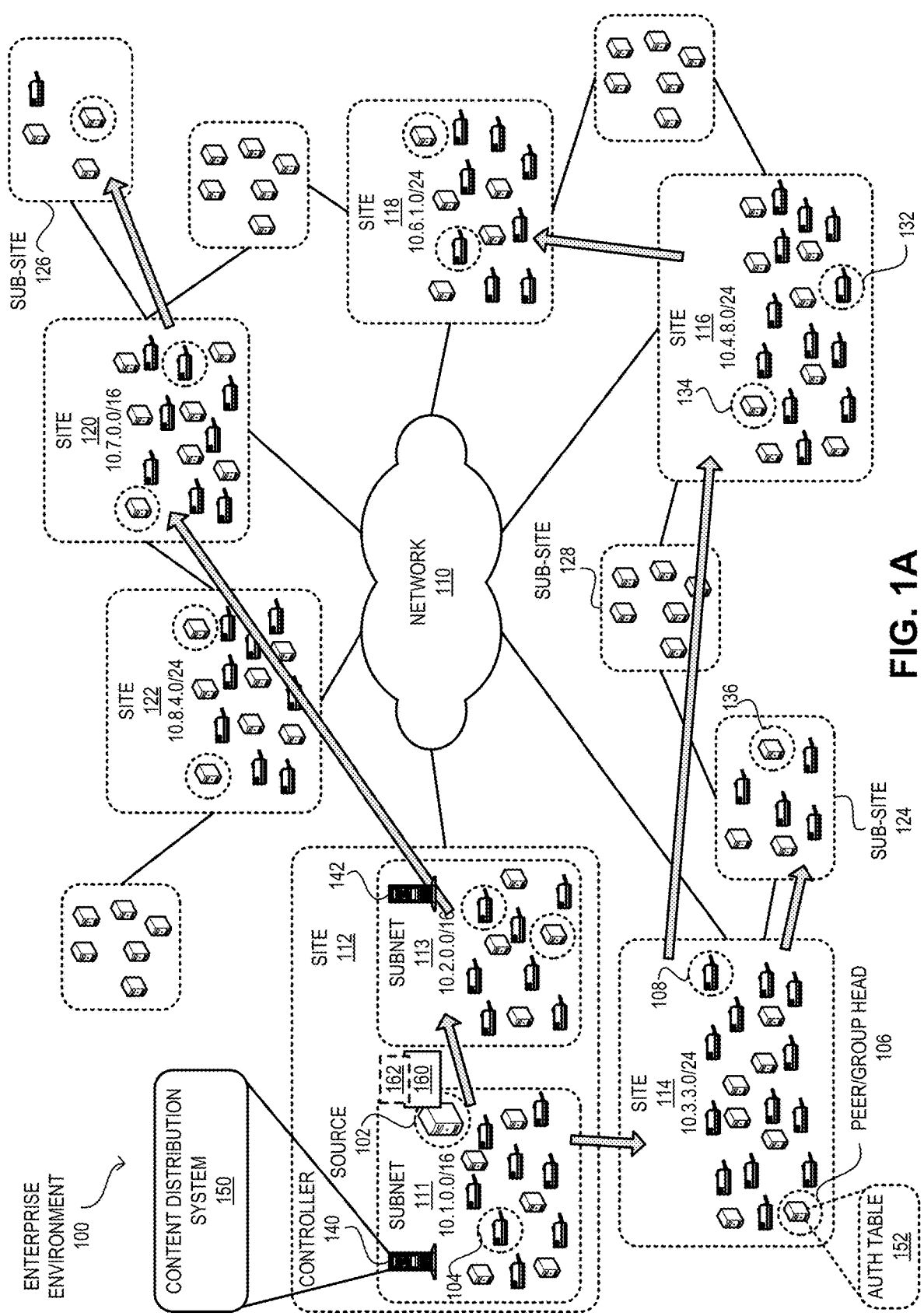
FIG. 1A illustrates an exemplary enterprise environment supporting an efficient content distribution protocol, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.
Overview The embodiments described herein solve the problem of efficiently distributing a piece of content (e.g., a file) in an enterprise environment by dividing the piece of content into blocks and transferring the piece of content block-by-block. A device in the enterprise environment can obtain a block from any device that has that block. Upon obtaining that block, the device may transfer that block to any other device requesting the block. In this disclosure, the phrases "a piece of content" and "a file" are used interchangeably.

With existing technologies, content distribution techniques are designed for the Internet. Such a technique usually operates assuming low correlation between device locality and bottleneck. As a result, a receiving entity of a traditional distribution protocol, such as a distributed peer-to-peer protocol, focuses on finding an existing piece of content and obtaining that piece of content from a source. These protocols may differ in how the piece of content can be found (e.g., based on locality, centralized controller, distributed management, redundancy, etc.). However, these protocols do not focus on distributing a single file to a large set of receiving devices in the enterprise environment.

Embodiments described herein solve these problems by providing a content distribution system that supports a block-based peer-to-peer transfer protocol. The system can divide a piece of content into blocks and may divide the blocks into chunks. Each participant in transferring a file is called a "peer" because peers communicate with other peers and operate based on a similar structure. A peer can use a file descriptor that lists the blocks of the piece of content for the block-by-block transfer. For each block, the descriptor can include a cryptographic checksum that can be verified by the peer.

To facilitate the block-by-block transfer, the system can instruct each peer which piece of content to transfer by providing the corresponding file descriptor to the peer. The system can also instruct the peer when to transfer the piece of content. For example, the system can instruct a peer to start operating as a server peer or a source peer for that piece of content. The system can also notify the server peer regarding the client peers or receiving peers. The system can also let the client peers know which peer to obtain the piece of content from (i.e., the server peer). Based on this instruction, a respective peer can subscribe to the server peer for the descriptor and waits for an offer for a block. Upon receiving at least a block, the server peer can offer that block to the peers it has subscribed to. Each receiving peer verifies a respective received block based on the cryptographic checksum of the block in the file descriptor.

If two peers are both server and client of each other, the corresponding peer relationship can be referred to as a full peer relationship. The peers in a full peer relationship can be referred to as full peers. Each peer relationship can be associated with a priority value. A higher priority value indicates a higher priority for selecting that peer. A full peer relationship is associated with a high priority value. Therefore, a respective peer prefers to obtain a block via the full peer relationship. A peer may receive multiple offers from the same block. If a peer receives an offer for a block from a peer with a lower priority compared to other peers (e.g., compared to a full peer), the peer can randomly back off for a predetermined period of time and check whether a higher priority peer has provided an offer for the block. This back-off process for a block can be referred to as a block back off. If no higher priority offer is received during the block back off, the peer can send a request for block based on the offer. On the other hand, if the peer receives an offer from a full peer, the peer sends a request to the full peer without performing the block back off.

In a full peer relationship, both peers may subscribe for a piece of content from one or more upstream peers and receive corresponding offers for blocks in that piece of content. For each block, each full peer can then perform a distributed election to determine which peer should download the block. This distributed election allows each peer to individually determine whether to accept an offer for a particular block of the piece of content. As a result, each peer only downloads unique blocks from an upstream peer. Since a full peer relationship is associated with a higher priority than inter-group links and only one full peer downloads a unique block from the upstream peer, if a full peer is elected to download the block, that peer may not perform the block back off. Instead, upon electing the local peer for a block, the full peer sends a request for the block. When the download is completed, the full peer can send the offer to the partner full peer of the full peer relationship.

In some embodiments, the system organizes a set of peers into a logical group (e.g., based on Internet Protocol (IP) subnets). To distribute a piece of content, the controller can generate a distribution tree that includes a logical group as a node of the tree. Each group can include one or more group heads responsible for obtaining the piece of content from an upstream node (i.e., the parent node of the tree). The root of the tree can be the subnet that includes the source of the piece of content. The group heads can be in a full peer relationship and use the block-based peer-to-peer transfer protocol to simultaneously download unique blocks of the piece of content. For example, the group heads can begin downloading random blocks and coordinate with each other to avoid duplication.

The group heads can also incorporate pipelining. When an upstream peer downloads a threshold amount of data, a downstream peer can start retrieving that data even if the entire piece of content has not been downloaded by the upstream peer. The threshold amount of data can be an individual block. This allows a peer to offer a block to another peer without downloading other blocks of the piece of content. Suppose that a 100 megabyte (MB) file is transferred over 1 megabytes per second (Mbps) links for 4 hops in the distribution tree. For a hop-by-hop transfer, the last node begins receiving the file after 300 seconds and finishes receiving it after 400 seconds. With a block-based protocol, the last hop begins data receiving data after 3 seconds and receives the entire file after 103 seconds.

Exemplary System

FIG. 1A illustrates an exemplary enterprise environment supporting an efficient content distribution protocol, in accordance with an embodiment of the present application. An enterprise environment 100 can be distributed across a number of sites 112, 114, 116, 118, 120, and 122. These sites can be coupled to each other via a network 110, such as a local or a wide area network. The wide area network can be the Internet. The sites can also have direct connection with each other (e.g., with point-to-point optical fiber). A site, such as site 112, can include multiple subnets 111 (e.g., 10.1.0.0/16) and 113 (e.g., 10.2.0.0/16). On the other hand, some other sites, such as site 114 can have one subnet (e.g., 10.3.3.0/24), which may span a sub-site 124 (e.g., a nearby smaller site under the same management). Similarly, site 120 can have one subnet (e.g., 10.7.0.0/16), which may span a sub-site 126. It should be noted that sub-sites 124 and 126 can also maintain their own sub-nets.

With existing technologies, content distribution techniques do not focus on distributing a single file to a large set of receiving devices in enterprise environment 100. For example, in environment 100, a source device 102 distributes a piece of content, such as a firmware update, via point-to-point communication to a large number of receiving peers. Since the piece of content is sent to a large number of receiving peers across the sites of enterprise environment 100, the distribution process can be repeated for each receiving peer in each site. Such a mode of distribution can cause a large amount of traffic in network 110 of enterprise environment 100. In addition, since each transfer can be an individual transfer between peers, each transfer can be vulnerable to failure. As a result, enterprise environment 100 can face a non-trivial failure rate.

To solve this problem, embodiments described herein provide a content distribution system 150 that supports a block-based peer-to-peer transfer protocol. System 150 can divide a piece of content 160 into blocks and may divide the blocks into chunks. Each participant in transferring a file is called a "peer" because peers communicate with other peers and operate based on a similar structure. A peer can use a file descriptor 162 that lists the blocks of content 160 for the block-by-block transfer. Descriptor 162 can be identified by a fingerprint (e.g., a SHA256 fingerprint) of descriptor 162. For each block, descriptor 162 can include a cryptographic checksum that can be verified by a peer. System 150 can register the peers in environment 100. Based on the registration, system 150 can discover the devices in environment 100.

System 150 can allocate a public key to each peer and an associated set of authorizations to establish rules to enforce a desired set of policies. System 150 also manages an authorizations table on each peer to enforce the policies. For example, an authorizations table 152 on peer 106 applies role-based security to each peer (or group of peers). Table 152 can maintain a number of permissions to facilitate the block-based protocol in enterprise environment 100. Descriptor 162 can be signed by controller 140 and peer 106 can authenticate descriptor 162 via table 152 by determining whether controller 140 has the permission to authorize the transfer of descriptor 162. This authorization can be based on a signature from controller 140 and additional metadata, such as a regular expression on the name associated with content 160, in descriptor 162.

System 150 can use one or more control channels (e.g., based on message queuing (MQ)) to send and/or receive control messages to the peers. Examples of a control message include, but are not limited to, a peer requesting to register with system 150, a peer requesting a new key from system 150, system 150 initiating a plan to distribute content 160 based on descriptor 162, and system 150 setting up plan-specific information in a peer. A respective control channel can use its specific authentication, authorization, and encryption (AAE) mechanisms. The AAE mechanism of the control channel can be independent of the AAE mechanism of a data channel. As a result, the AAE of a control channel may not influence the AAE of the data channel. A respective data message can carry an individual signature or message authentication code. In some embodiments, system 150 can use authentications tables for control message processing.

To efficiently distribute content 160, system 150 discovers the topography of enterprise environment 100 based on the registration, plans a distribution overlay for content 160, and uses the block-by-block transfer to distribute content 160 via the overlay. System 150 can facilitate a security framework, a control framework, and a data transfer framework. The security framework can provide security to both the control channel and the data channel. A distinguished device 140 can be responsible for controlling the system and is thus called controller 140. In some embodiments, system 150 can be hosted on controller 140. In this disclosure, controller 140 and system 150 are used interchangeably. Enterprise environment 100 can include a plurality of controllers 140 and 142, which can facilitate high availability to each other. Controller 140 can authenticate messages (e.g., using a public key system and/or a symmetric key exchange).

Controller 140 can instruct the peers in enterprise environment 100 to take measurements, such as device configurations and network conditions, and provide the measurements to controller 140. Controller 140 can determine the topographical information of enterprise environment 100 based on the measurements. Controller 140 can then plan efficient distribution paths for a specific piece of content 160 from a source peer 102. Controller 140 and source peer 102 can be the same device or different devices. Controller 140 can notify each peer in enterprise environment 100 regarding which piece of content to request. Controller 140 can also notify a respective peer of a timeframe for content 160 (e.g., when to request and where to request from). In some embodiments, controller 160 organizes a set of peers into a logical group based on one or more grouping criteria. Examples of a grouping criterion include, but are not limited to, an IP subnet, a local area network, and a spanning tree in a layer-2 network.

To distribute content 160, controller 140 can generate a distribution tree that includes a logical group as a node of the tree. In this example, a respective site or sub-site is represented as a logical group and a highlighted arrow depicts each branch of the tree. Since site 112 has two subnets 111 and 113, they can be two different nodes on the tree. If a site or sub-site, such as sub-site 128, of enterprise environment 100 does not include a recipient for content 160, that sub-site is not included in the tree. Each group can include one or more group heads (denoted with dashed circles) responsible for obtaining the piece of content from an upstream peer (i.e., the parent node of the tree). The group corresponding to subnet 111 can include source peer 102 and peer 104 as group heads. Similarly, the logical group corresponding to site 114 can include peers 106 and 108 as group heads, and the logical group corresponding to site 116 can include peers 132 and 134 as group heads. Hence, peers 102, 104, 106, 108, 132, and 134 can be referred to as group heads as well. The root of the tree in this example is subnet 111, which includes source device 102 hosting content 160. It should be noted that controller 140 can plan a distribution tree for each piece of content, which can vary (e.g., based on source device and receiving devices).

In some embodiments, controller 140 can calculate a Steiner tree (e.g., a minimum-cost tree) to generate the inter-group distribution tree. In enterprise environment 100, some peers can be receiving peers (e.g., a recipient of content 160) and the other devices can operate as relay peers or dormant devices. The Steiner tree can span all receiving devices, if needed, using some relay devices, to find the minimum-cost tree. Controller 140 can calculate a minimum-cost tree using a combination of shortest paths. Controller 140 can determine the shortest paths from each receiving device to the source device in enterprise environment 100 using the topography information of enterprise environment 100. Controller 140 then determines the minimum cost single source directed spanning tree from all receiving devices to source peer 102.

Controller 140 can determine the topography information of enterprise environment 100 based on one or more of: a user input and network discovery using measurements. Controller 140 can perform the network discovery by measuring the bandwidth and round-trip time between two subnets. To do so, source device 102 sends a series of packets of different lengths a number of times to each group head. Controller 140 determines the minimum response time for each packet size and calculates the linear regression on those values. Controller 140 also determines the bandwidth in bits per second, and the round-trip time is in seconds. Controller 140 can aggregate multiple measurements via an exponential moving average to determine the bandwidth of a link.

Group heads are responsible for inter-group data transfer and are configured with full peer relationship. As a result, a group head only obtains unique blocks and shares that block with the peer group head. To facilitate inter-group transfer, group heads 106 and 108 can be logically coupled to upstream group heads 102 and 104. Similarly, group heads 132 and 134 can be logically coupled to upstream group heads 106 and 108. If a logical group does not have a sufficient number of receiving peers for content 160, that logical group may not have multiple group heads. For example, the logical group corresponding to sub-site 124 can include one group head 136. For efficient distribution, controller 140 can divide content 160 into a number of blocks (e.g., each with a predefined number of data chunks of fixed size). Since group head 104 is in the same logical group of source 102, group head 104 first obtains content 160 from source 102.

To facilitate the block-by-block transfer, system 150 can instruct each peer, such as peer 106, regarding content 160 by providing file descriptor 162 to peer 106. System 150 can also instruct peer 106 when to transfer content 160. System 150 can instruct source peer 102 to start operating as a server peer for content 160. System 150 can provide a list of client peers, such as peers 106 and 108, to server peer 102. System 150 can also notify peers 106 and 108 that content 160 is available from server peer 102. Based on this notification, peers 106 and 108 can subscribe to server peer 102 for descriptor 162 and wait for an offer for a block. Peer 102 can offer that block to peers 106 and 108. Peers 106 and 108 verify a respective received block based on the cryptographic checksum of the block in file descriptor 162.

Figure 1B:
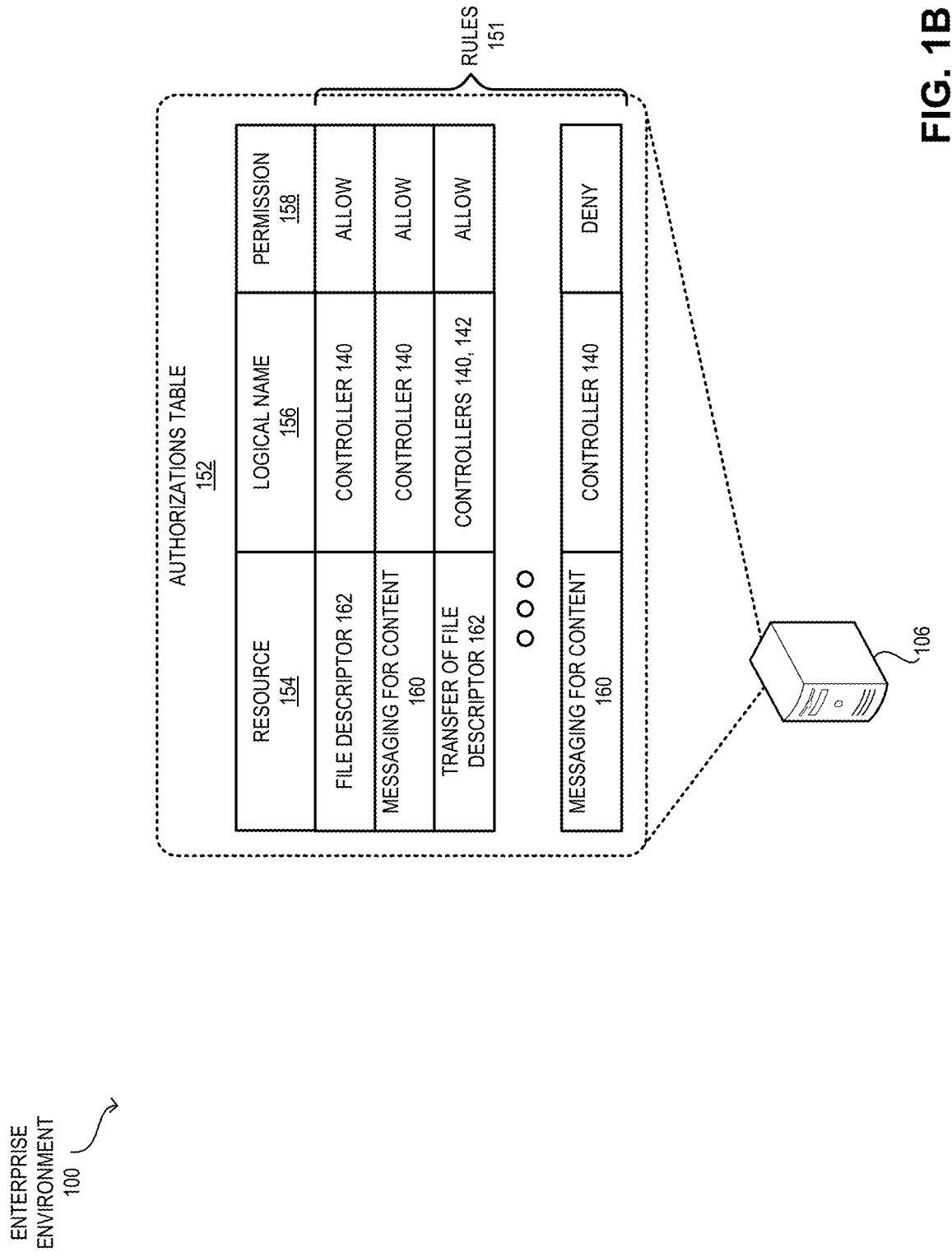
FIG. 1B illustrates an exemplary authorizations table for facilitating role-based security for the content distribution protocol, in accordance with an embodiment of the present application.

FIG. 1B illustrates an exemplary authorizations table for facilitating role-based security for the content distribution protocol, in accordance with an embodiment of the present application. Table 152 can maintain a number of permissions to facilitate the block-based protocol in enterprise environment 100. Examples of the permissions include, but are not limited to, permission to sign a file descriptor, sign a command to start a distribution, sign a command to start a transfer, and connect to a peer to provide a descriptor. Table 152 can have a default permission (e.g., allow or deny) plus a set of rules 151 that are evaluated in order. The first rule in rules 151 that matches determines the result. A respective rule can map a resource 154 (e.g., expressed as a regular expression) to a logical name 156 (e.g., a logical group name or an alias for a device) and a corresponding permission 158 (e.g., allow or deny). The regular expression associated with resource 154 can be used for matching message types and transfer services, and can be stored in an encryption wrapper. For example, file descriptor 162 can have an "allow" permission for controller 140.

Exemplary Block-Based Content Distribution

Figure 1C:
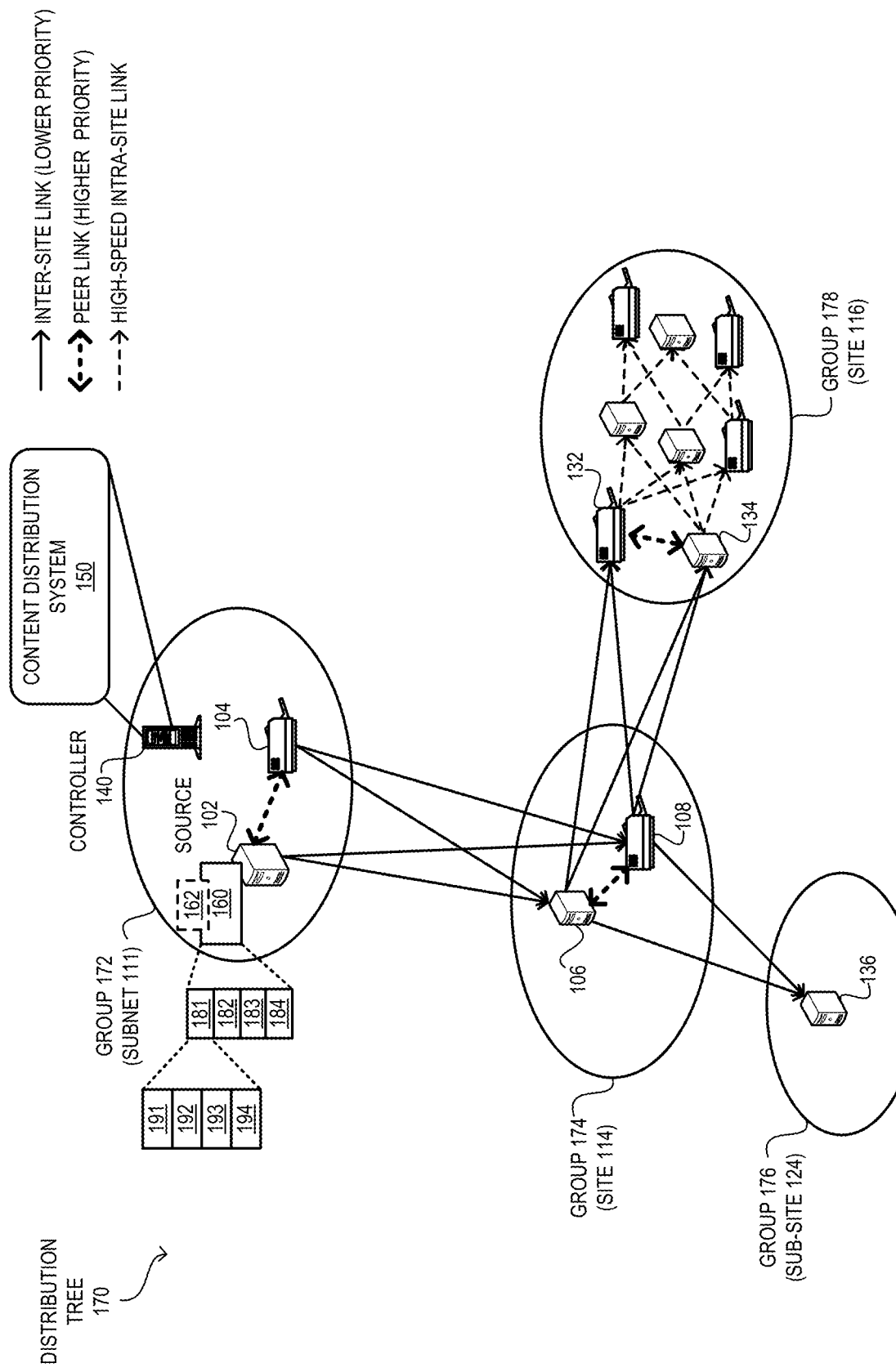
FIG. 1C illustrates an exemplary block-based peer-to-peer distribution of content in an enterprise environment, in accordance with an embodiment of the present application.

FIG. 1C illustrates an exemplary block-based peer-to-peer distribution of content in an enterprise environment, in accordance with an embodiment of the present application.

In this example, controller 140 can generate a distribution tree 170 for distributing content 160. Distribution tree 170 can include logical groups 172, 174, 176, and 178 as nodes of tree 170. Logical groups 172, 174, 176, and 178 can correspond to subnet 111, site 114, sub-site 124, and site 116, respectively. Controller 140 can determine at least two managed devices, which can be receiving devices or relaying devices, as group heads. Source 102 and device 104 can be group heads for group 172, devices 106 and 108 can be group heads for group 174, device 136 can be group head for group 176, and devices 132 and 134 can be group heads for group 178.

System 150 can modify distribution tree 170 for content 160 even when the peers are transferring blocks of content 160. System 150 can establish new upstream peers for a peer, remove permission for a peer to connect to an upstream peer, or change the priority value of a peer relationship. A peer can use registration with system 150 to indicate that the peer is available to participate in distribution tree 170. It should be noted that a peer does not register as a "seeder" with system 150 to participate in distribution tree 170. System 150 determines the available resources of a peer and plans how to use the resources for distributing content 160.

The inter-group links can be formed between the group heads. For example, the links between groups 172 and 174 are between group heads 102 and 104 of group 172, and group heads 106 and 108 of group 174. Since group 176 includes one group head 136, the links between groups 174 and 176 are between group heads 106 and 108 of group 174, and group head 136 of group 176. Each group head can maintain a link with each upstream group head (e.g., each parent group head). For example, group head 136 can have a link to each of group heads 106 and 108.

Group heads within a group can have a full peer relationship with each other with a corresponding peer link, which allows them to transfer data using peer-to-peer transfer protocol to coordinate data blocks. For example, peers 106 and 108 can be both server and client peers of each other. Hence, peers 106 and 108 can be full peers and in a full peer relationship. Each peer relationship can be associated with a priority value. A higher priority value indicates a higher priority for selecting that peer. A full peer relationship is associated with a high priority value. Therefore, a respective peer prefers to obtain a block via the full peer relationship. The relationship between a respective peer pair, such as peers 106 and 108, is defined by system 150. The relationship can be unidirectional or bidirectional. System 150 can configure the priority value of the relationship based on one or more of: network conditions, device capacities, device policies, and enterprise policies associated with environment 100.

Suppose that content 160 is divided into blocks 181, 182, 183, and 184. A block can be further divided into one or more data chunks. For example, block 181 can be divided into chunks 191, 192, 193, and 194. The size of a chunk can be a predetermined number of bytes. The size of a block, such as block 181, should be an integer multiple of the chunk size to maintain a regular structure for the blocks and chunks. However, the last block, such as block 184, may have fewer chunks; and the last chunk, such as chunk 194, may have fewer bytes. A chunk can be identified by its offset in a block. Hence, the chunk identifier in a block can be a small integer. For example, chunk 192 can be identified in block 181 by an offset of the size of chunk 191.

Since peers 106 and 108 are in a full peer relationship, both peers 106 and 108 may subscribe for content 160 from upstream peers 102 and/or 104, and receive corresponding offers for blocks 181, 182, 183, and 184. For each block, such as block 181, peers 106 and 108 can then perform a distributed election to determine which peer should download block 181. This distributed election allows each of peers 106 and 108 to individually determine whether to accept an offer for block 181. The election process can be based on a random assignment method. Each one of peers 106 and 108 individually can compute a hash value of a concatenation of one or more of: the fingerprint of descriptor 162, the block number of block 181, and an identifier of a peer. Each one of peers 106 and 108 can compute this hash value for both peers 106 and 108, and determine the peer corresponding to the smallest value as the designated downloader for block 181.

As a result, each of peers 106 and 108 only downloads unique blocks from upstream peers 102 and/or 104. For example, based on the election peer 106 can download blocks 181 and 183, and peer 108 can download blocks 182 and 184. Since a full peer relationship is associated with a higher priority than inter-group links and only peer 106 downloads block 181 from upstream peer 102 or 104, peer 106 may not perform the block back off. Instead, if peer 106 is elected for downloading block 181, peer 106 sends a request for block 181 to upstream peer 102 or 104. When the download is completed, peer 106 can send an offer for block 181 to partner peer 108 of the full peer relationship. Upon receiving the offer from a high-priority full peer relationship, peer 108 can send a request for block 181 to peer 106.

In some embodiments, peers 106 and/or 108 can request a chunk of a block after receiving an offer. This offer can be based on a block or a chunk. For example, upon receiving an offer for block 181, peer 106 may request chunk 191 from peer 102 by sending a request message with a corresponding chunk identifier. Peer 106 can request the subsequent chunk 192 from peer 104. It should be noted that peer 106 can send a pipeline of requests without waiting for chunks one-by-one. For content 160, file descriptor 162 can include the chunk size and the block size. As a result, peer 106 can calculate memory offsets while storing content 160 in its memory (e.g., using the mmap system call). Peer 106 can automatically reconstruct block 181 upon receiving each of chunks 191, 192, 193, and 194. Similarly, peer 106 can automatically reconstruct content 160 upon receiving each of blocks 181, 182, 183, and 184.

On the other hand, a peer, such as peer 136, which is not in a full peer relationship, may receive multiple offers from the same block, such as block 181. Suppose that peer 136 receives an offer for block 181 from peer 106. Since the priority value of the peer relationship between peers 106 and 136 can have a lower priority compared to that of a full peer relationship, peer 136 can perform a block back off for a predetermined period of time and check whether a higher priority peer has provided an offer for block 181. Here, the priority value of the full peer relationship can be the threshold for comparing the priority value of the peer relationship between peers 106 and 136. System 150 can determine the predetermined period of time based on monitoring the time between the arrivals of lower priority and higher priority offers or a configured value. If no higher priority offer is received during the block back off, peer 136 can send a request to peer 106 for block 181 based on the offer.

In some embodiments, system 150 can register the public key of a respective peer and manage a Pretty Good Privacy (PGP)-type keyring for each peer system 150 is allowed to communicate with. The data channel between two peers can be based on secure shell (SSH) or mutually authenticated Transport Layer Security (TLS) protocol. For each transfer (e.g., a transfer in inter-group or full peer relationship), system 150 can rely on a number of authentications and authorizations for a secure transfer of control and data messages. The authentications and authorizations include one or more of: authentication and authorization on the control channel, permission to register with system 150, permission to send a piece of content to one or more root/source peers, permission to send a command to system 150 to initiate a plan to distribute the piece of content, permission to send a transfer command to a specific peer, each peer authenticating descriptor 162's signature (can be distinct from the permission to send a transfer command), permission for data exchange between peers, permission for a peer to subscribe to descriptor 162 over a data channel, permission for a peer to publish descriptor 162 over the data channel (e.g., accepting a subscription for descriptor 162).

System Architecture

Figure 2:
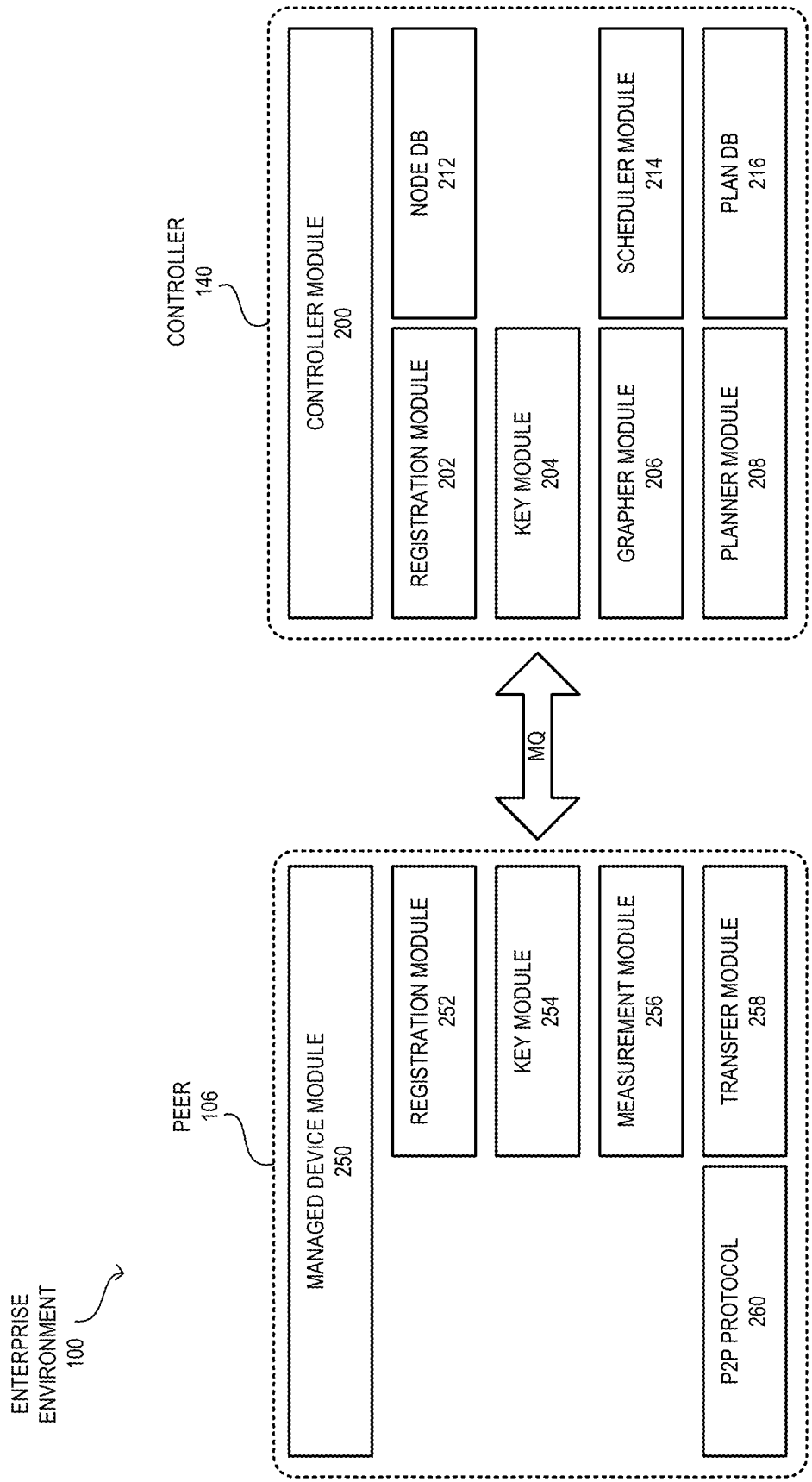
FIG. 2 illustrates an exemplary system architecture that facilitates efficient distribution of content in an enterprise environment, in accordance with an embodiment of the present application.

FIG. 2 illustrates an exemplary system architecture that facilitates efficient distribution of content in an enterprise environment, in accordance with an embodiment of the present application. In this example, controller 140 and a respective managed device, such as peer 106, include the principle operational modules controller module 200 and managed device module 250, respectively. Controller module 200 operates based on registration module 202, key module 204, grapher module 206, scheduler module 214, and planner module 208. On the other hand, managed device module 250 can operate based on registration module 252, key module 254, measurement module 256, and transfer module 258.

In controller 140, registration module 202 can listen for registration requests and unregister request messages from managed devices. Based on the requests, registration module 202 maintains information of a current set of devices and subnets in enterprise environment 100 in a node database 212. Key module 204 can listen for key request messages from managed devices and perform key exchange, such as Ephemeral Elliptic Curve Diffie-Hellman, using message queuing. Key module 204 also updates controller 140's keyring with symmetric keys, such as hash-based message authentication code (HMAC). Grapher module 206 can listen for the measurement response messages, and based on these messages, maintains a weighted subnet-to-subnet graph of enterprise environment 100.

Scheduler module 214 periodically schedules measurements between subnets to measure network performance and properties. Scheduler module 214 also maintains a table indicating the edges between the subnets in node database 212. Planner module 208 determines, for a piece of content, the source device and target subnets, which include receiving devices, based on the currently registered devices and schedules experiments to determine a distribution tree. Planner module 208 initiates distribution of the piece of content by generating a distribution plan and storing it in a plan database 216. Planner module 208 can receive notification from the managed devices regarding the distribution.

In peer 106, registration module 252 sends periodic registration request messages to controller 140 and listens for responses. An administrator (system 150) can provision peer 106 with the controller 140's public key and initialize authorizations table 170, as described in conjunction with FIG. 1B, such that controller 140 has full permissions. In some embodiments, controller 140 can obtain peer 106's public key and authorizes peer 106 for device-related messages. Registration module 252 can send a registration request message to controller 140. The registration request can include one or more of: peer 106's identity, peer-to-peer IP address and port, and information about make, model, and firmware version of peer 106. If any of this information changes, registration module 252 can send a new registration request. Registrations may have a timeout period (e.g. one hour). Registration module 252 can resend the registration request before the timeout expires. Registration module 202 of controller 140 receives the registration request, updates node database 212, and sends a registration response back to acknowledge the request.

Key module 254 periodically generates new keys by sending a key exchange request message and listening for corresponding responses. Key module 254 can also update peer 106's keyring with the symmetric keys (e.g., HMAC). Measurement module 256 can listen for initialization of the network measurement. Based on that, measurement module 256 can schedule network measurement and sends the measurements to grapher module 206. Transfer module 258 listens for a message from controller 140 initializing the distribution of a piece of content and schedules peer-to-peer transfers via a block-based peer-to-peer protocol 260. Transfer module 258 can send the responses to acknowledge the transfer initialization message and notifies controller 140 regarding significant events (e.g., starting, finishing, detection of error, etc.). Protocol 260 performs a peer-to-peer file transfer under the control of planner module 208.

Planning Operations

Figure 3A:
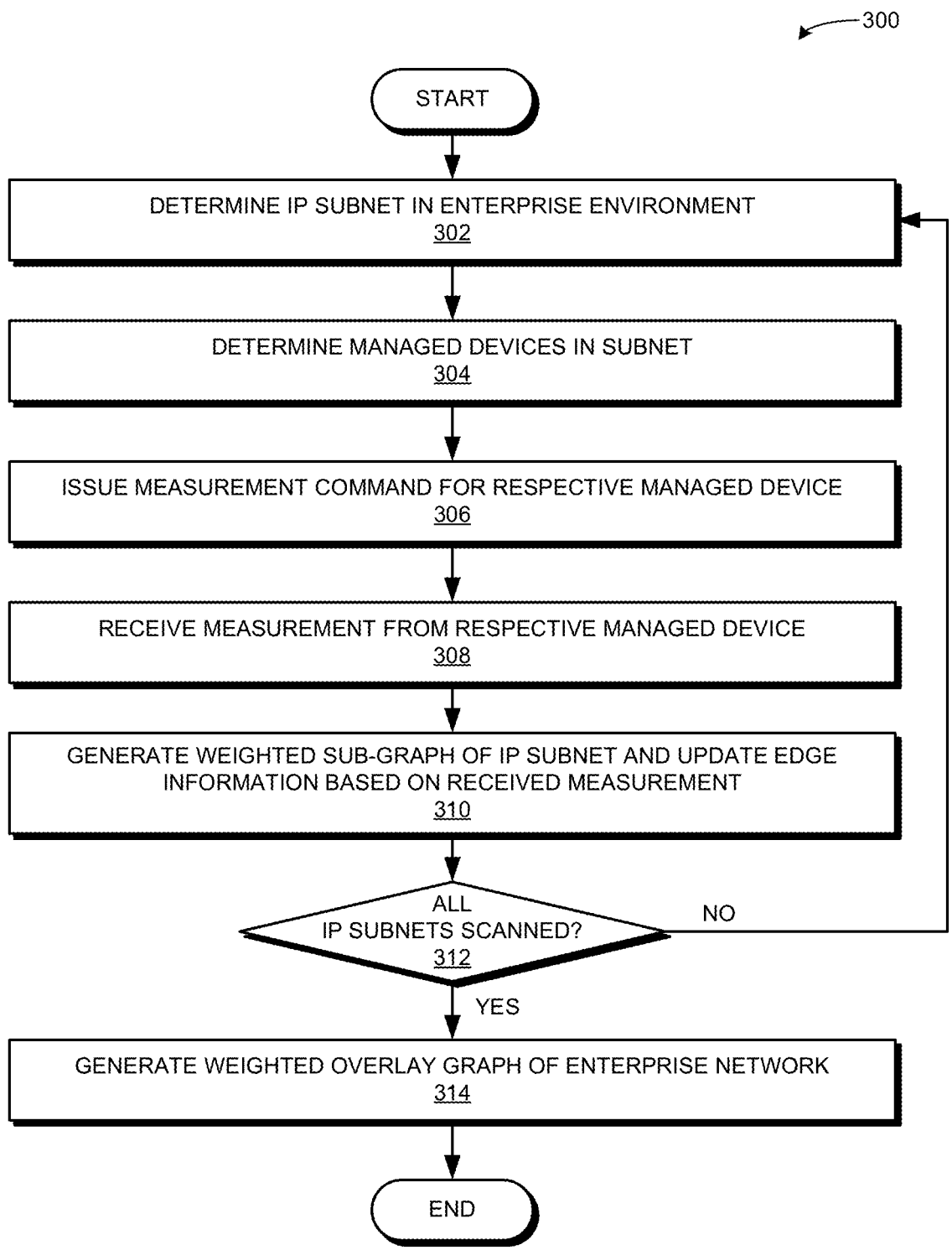
FIG. 3A presents a flowchart illustrating a method of a content distribution system determining topographical information of an enterprise environment, in accordance with an embodiment of the present application.

FIG. 3A presents a flowchart 300 illustrating a method of a content distribution system determining topographical information of an enterprise environment, in accordance with an embodiment of the present application. During operation, the system determines an IP subnet in an enterprise environment (operation 302) and determines the managed devices in the subnet (operation 304). The system then issues a measurement command for a respective managed device (operation 306) and receives measurements from a respective managed device (operation 308). The measurement command instructs the managed device to measure network and device conditions (e.g., bandwidth, latency, utilization, etc.), and report back to the system. The system generates a weighted sub-graph of the IP subnet and updates the edge information based on the received measurement (operation 310). The system checks whether all subnets have been scanned (operation 312). If scanned, the system generates a weighted overlay graph of the enterprise network (operation 314). Otherwise, the system continues to determine the next IP subnet in the enterprise environment (operation 302).

Figure 3B:
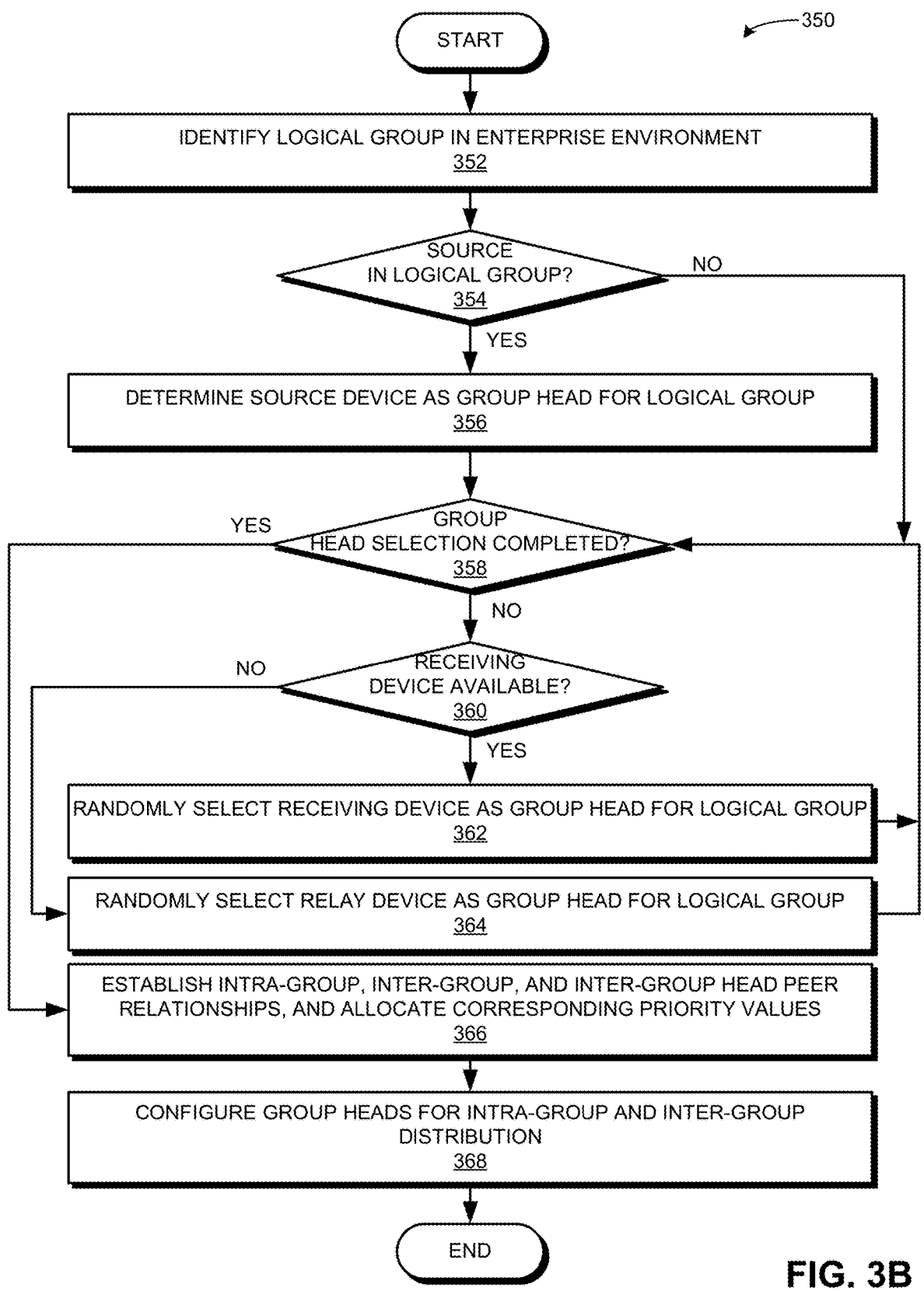
FIG. 3B presents a flowchart illustrating a method of a content distribution system planning the distribution of a piece of content based on the topographical information of an enterprise environment, in accordance with an embodiment of the present application.

FIG. 3B presents a flowchart 350 illustrating a method of a content distribution system planning the distribution of a piece of content based on the topographical information of an enterprise environment, in accordance with an embodiment of the present application. During operation, the system identifies a logical group in the enterprise environment (e.g., based on a subnet or a site) (operation 352) and determines whether the source device of the piece of content is in the logical group (operation 354). If the source device is in the logical group, the system determines the source device as a group head for the logical group (operation 356). The system then determines whether the group head selection has completed (e.g., a predetermined number, such as two, of group heads has been selected or no more devices to select) (operation 358). If group head selection is not completed, the system checks whether any receiving device for the piece of content is available in the logical group (operation 360).

If at least one receiving device is available, the system randomly selects a receiving device as a group head for the logical group (operation 362). Otherwise, the system randomly selects a relay device as a group head for the logical group (operation 364). Upon selecting the group head (operation 362 or 364), the system continues to determine whether the group head selection has completed (operation 358). If group head selection is completed, the system establishes inter-group, intra-group, and inter-group head peer relationships, and allocates corresponding priority values (operation 366). The system then configures the group heads for intra-group and inter-group distribution (operation 368). This configuration can include configuring block-based peer-to-peer protocol.

Block-Based Peer-to-Peer Protocol

Figure 4A:
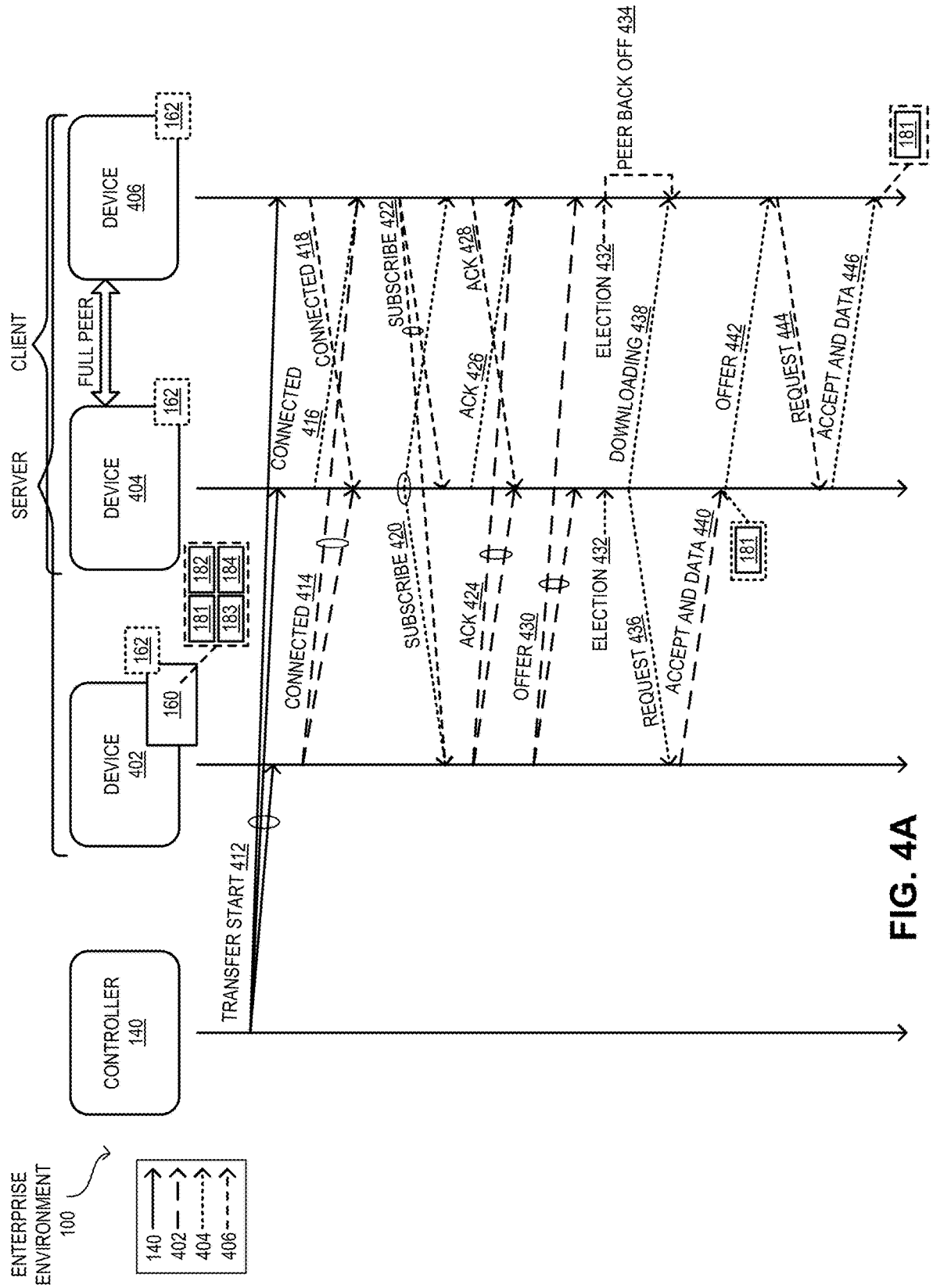
FIG. 4A illustrates an exemplary initial distribution of a block to full peers in an enterprise environment, in accordance with an embodiment of the present application.

FIG. 4A illustrates an exemplary initial distribution of a block to full peers in an enterprise environment, in accordance with an embodiment of the present application. In this example, enterprise environment 100 includes devices 402, 404, and 406. Device 402 can be an upstream peer of devices 404 and 406. During operation, controller 140 sends a transfer start command for content 160 to devices 402, 404, and 406 (operation 412). This command causes devices 402, 404, and 406 to start operating as a server for content 160 at a specified time. The transfer start command to devices 404 and 406 can also specify one or more peers. This can cause devices 404 and 406 to become clients to those peers. For example, the transfer start command to device 404 can specify devices 402 and 406 as peers. Hence, device 404 can become a client of devices 402 and 406. Similarly, the transfer start command to device 406 can specify devices 402 and 404 as peers. Suppose that device 402 currently stores a copy of content 160.

Since devices 404 and 406 have parallel client/server connections (i.e., are clients and servers of each other), devices 404 and 406 establish a full peer relationship and start operating as full peers. When a server becomes ready to process a connection from a peer, the sever can send a connected command. For example, device 402 can send connected commands to devices 404 and 406 (operation 414). Since devices 404 and 406 are full peers, devices 404 and 406 send connected commands to each other (operations 416 and 418, respectively). This allows a corresponding client to begin data transfer. A client can send one or more subscribe messages to a server indicating an interest in a particular descriptor. For example, device 404 can send a subscribe message for descriptor 162 of content 160 to devices 402 and 406 (operation 420); and device 406 can send a subscribe message for descriptor 162 to devices 402 and 404 (operation 422). A respective subscribe message can identify descriptor 162 based on the fingerprint of descriptor 162 (e.g., base64 encoding of SHA256 fingerprint of descriptor 162 in JavaScript Object Notation (JSON) format).

A server can respond to a subscription with either an acknowledgment or a reject message indicating whether the server is ready to serve the client for that descriptor. For example, device 402 can send respective acknowledgment messages corresponding to descriptor 162 to devices 404 and 406 (operation 424). Similarly, devices 404 and 406 can send respective acknowledgment messages to each other (operations 426 and 428, respectively). A server may reject a subscription for one or more of: (1) the server does not serve that descriptor, (2) the client is not authorized on the server for that descriptor, and (3) the server cannot accommodate the client due to resource constraints. For each acknowledged subscription, a server can send an offer message for the available blocks of content 160. Device 402 can send an offer indicating the set of available blocks of content 160 to devices 404 and 406 (operation 430).

The offer message lists the indices into the block chain of descriptor 162. The offer can be a batch offer for multiple blocks or an individual block (e.g., a one-by-one offer for each new block in device 402). On the other hand, since devices 404 and 406 have not received any blocks yet, these devices do not send any offer message. For each offered block, a client decides whether it needs to download the block and, if so, from which server. Based on the offer received from device 402, device 404 and 406 can select device 402 as the server for content 160. Since devices 404 and 406 are in a full peer relationship, instead of performing a block back off, devices 404 and 406 can perform a distributed election for a respective block. For block 181, devices 404 and 406 can perform a distributed election to determine which device should download block 181 (operation 432).

Suppose that devices 404 and 406 determine that device 404 should download block 181. Device 404 then sends a request for block 181 (operation 436) and sends a downloading message to device 406 indicating that device 404 has initiated the download (operation 438). Device 406 performs a peer back off for a predetermined period of time waiting for a downloading message (operation 434). This predetermined period of time should be greater than the time needed by a full peer to send a downloading message. The time can be determined based on one or more of: the length of the downloading message, bandwidth of the link coupling the peer, number of devices sharing the link, the time to elect a peer for downloading, and the time to notify another peer. If the election process fails to determine a peer that should download a block, the full peer may repeat the election process. For each repetition, a device that failed to win can be excluded unless the device receives a downloading message or the device itself wins the election. When device 402 receives a request for block 181, as indicated in descriptor 162, device 402 can decide whether to serve the request, and sends back either an accept or a decline message.

Suppose that device 402 accepts the offer and sends an accept message to device 404 (operation 440). The acceptance also includes sending a data message comprising block 181 (operation 440). The data message can include a header that identifies descriptor 162 and a request identifier associated with the request from device 404. As block 181 becomes available at device 404, device 404 starts operating as a server and sends an offer for block 181 to device 406 (operation 442). Since the offer is from a high-priority full peer relationship, device 406 can immediately send a corresponding request to device 404 (operation 444). In response, device 404 sends an accept message and a data message comprising block 181 to device 406 (operation 446).

Figure 4B:
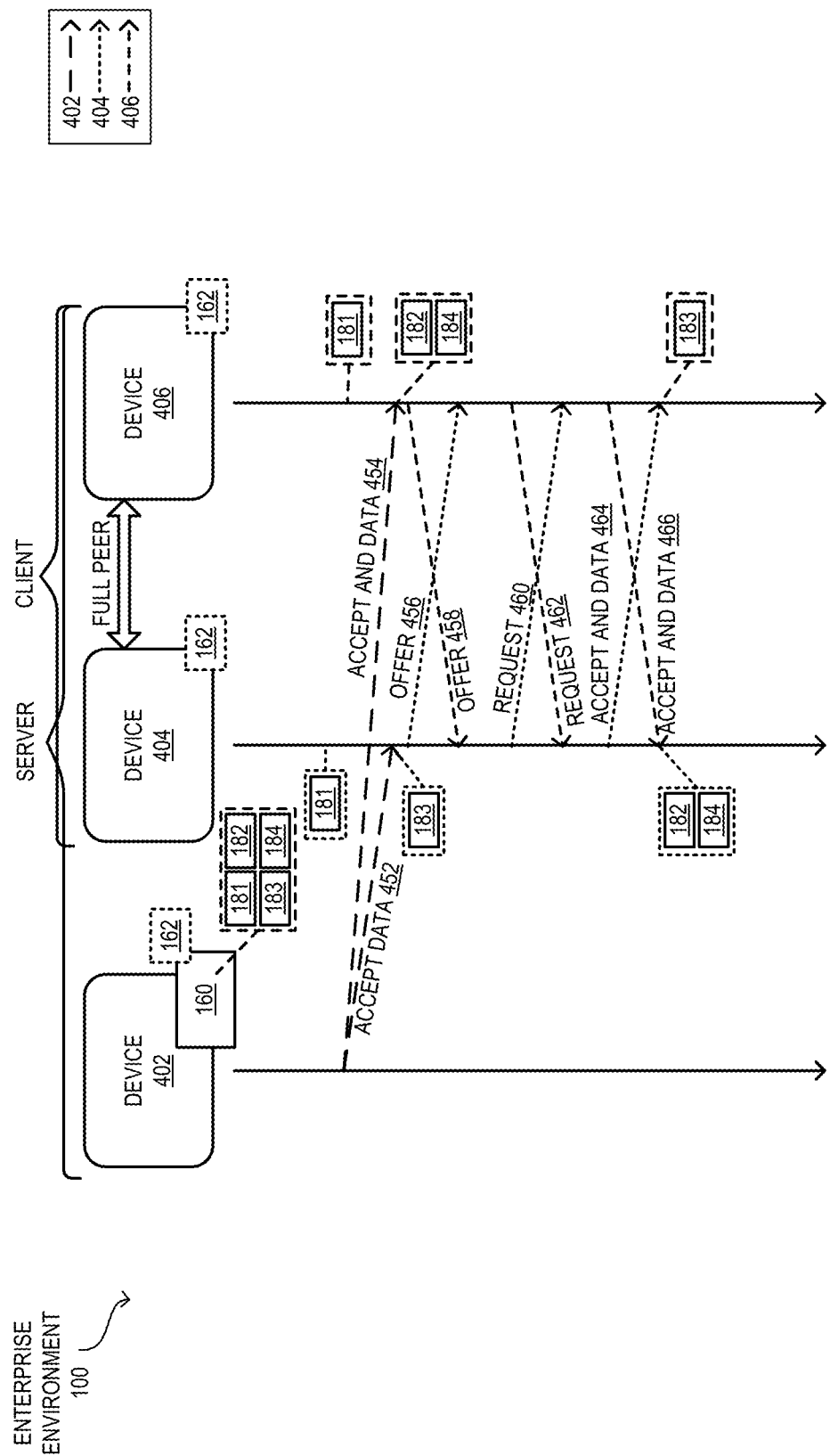
FIG. 4B illustrates an exemplary subsequent distribution of blocks to full peers in an enterprise environment, in accordance with an embodiment of the present application.

FIG. 4B illustrates an exemplary subsequent distribution of blocks to full peers in an enterprise environment, in accordance with an embodiment of the present application. In this example, block 181 is available in devices 404 and 406, as described in conjunction with FIG. 4A. Suppose that device 404 has been elected for block 183, and device 406 has been elected for blocks 182 and 184. Accordingly, device 402 sends an accept message and a data message comprising block 183 to device 404 (operation 452), and one or more accept messages and corresponding data messages comprising blocks 182 and 184 to device 406 (operation 454).

As block 183 becomes available at device 404, device 404 sends an offer for block 183 to device 406 (operation 456).

Similarly, as blocks 182 and 184 become available at device 406, device 406 starts operating as a server and sends one or more offers for blocks 182 and 184 to device 404 (operation 458). Since the offer is from a high-priority full peer relationship, device 404 can immediately send one or more requests for blocks 182 and 184 to device 406 (operation 460). Device 406 can also immediately send a request for block 183 to device 404 (operation 462). Subsequently, device 404 sends an accept message and a data message comprising block 183 to device 406 (operation 464), and device 406 sends one or more accept messages and corresponding data messages comprising blocks 182 and 184 to device 404 (operation 466). Based on this data exchange, devices 404 and 406 obtain a respective block of content 160.

Figure 4C:
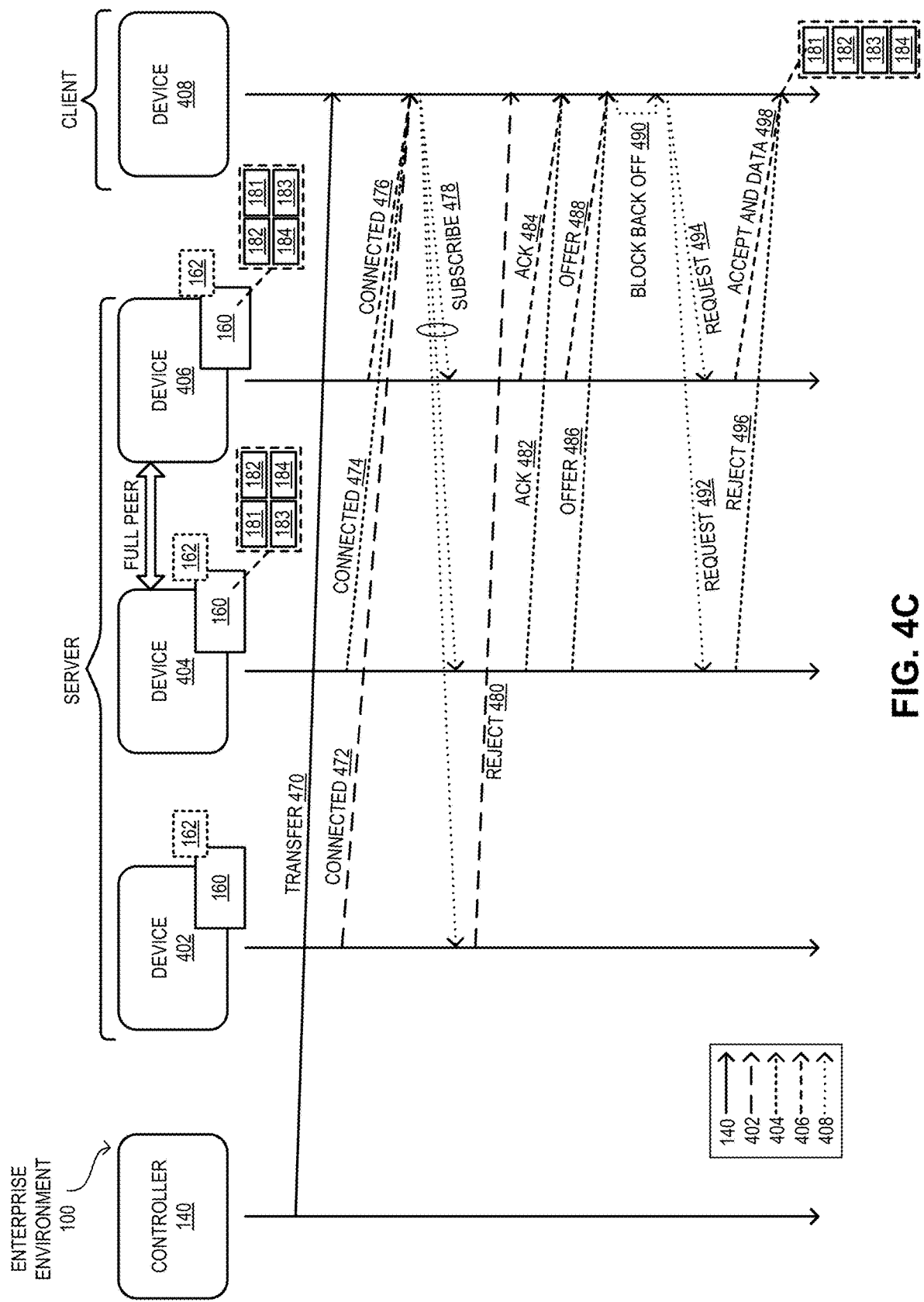
FIG. 4C illustrates an exemplary content distribution to a downstream device in an enterprise environment, in accordance with an embodiment of the present application.

FIG. 4C illustrates an exemplary content distribution to a downstream device in an enterprise environment, in accordance with an embodiment of the present application. Enterprise environment 100 can include device 408, which may not be in a full peer relationship. During operation, controller 140 sends a transfer command to device 408 indicating devices 402, 404, and 406 as servers for content 160 (operation 470). When devices 402, 404, and 406 become ready to process a connection from device 408, devices 402, 404, and 406 can send respective connected commands to device 408 (operations 472, 474, and 476, respectively). Since devices 404 and 406 are full peers, devices 404 and 406 can send connected commands to each other (operations 416 and 418, respectively).

Device 408 can then send a subscribe message for descriptor 162 of content 160 to devices 402, 404, 406 (operation 478). A respective subscribe message can identify descriptor 162 based on the fingerprint of descriptor 162. Devices 404 and 406 can respond to the subscription with respective acknowledgment messages corresponding to descriptor 162 (operations 482 and 484, respectively). However, device 402 can send a reject message indicating device 402 is not ready to serve device 408 for descriptor 162 (operation 480). Device 402 may reject the subscription for one or more of: (1) device 402 does not serve descriptor 162 any longer, (2) device 408 is not authorized on device 402 for descriptor 162, and (3) device 402 cannot accommodate device 408 due to resource constraints. Devices 404 and 406 can send respective offers indicating the set of available blocks of content 160 to device 408 (operations 486 and 488, respectively).

Device 408 then determines the subscription with the highest priority, which is the subscription to device 404 or 406. Since devices 404 and 406 are upstream peers of device 408, the corresponding relationships are configured with a lower priority value compared to that of a full peer relationship. Hence, device 408 performs a block back off for a predetermined period of time (operation 490). The block back off provides a higher priority peer, if any, a chance to offer a block of content 160. If device 408 does not receive an offer within the time of the block back off, device 408 may send respective requests for the blocks of content 160 from the lower priority subscription to devices 404 and 406 (operations 492 and 494, respectively). Device 404 may determine that it cannot serve the request and sends a reject message back to device 408 (operation 496). On the other hand, device 406 can send an accept message, and one or more data messages comprising the blocks of content 160 to device 408 (operation 498).

Protocol Operations

Figure 5:
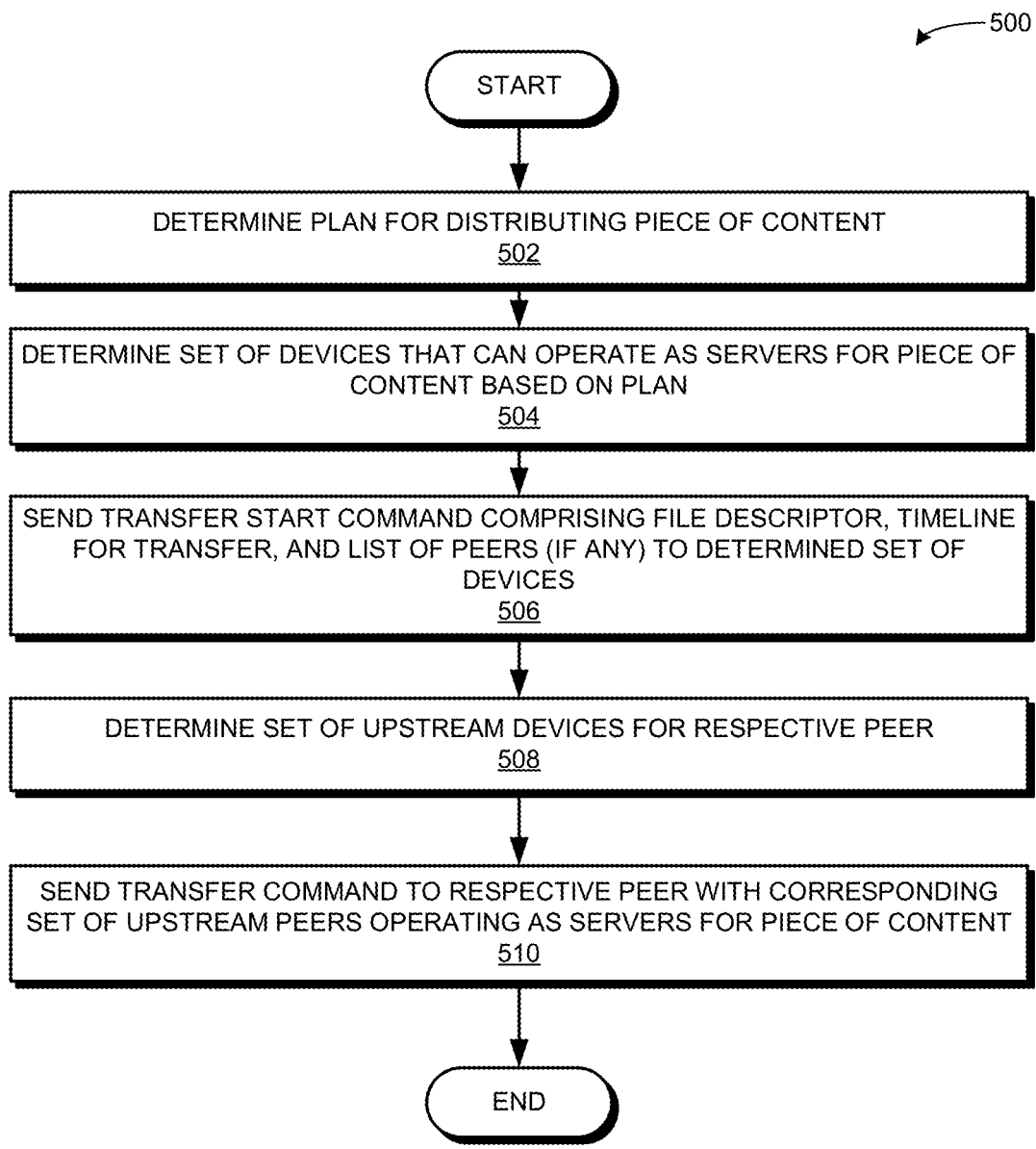
FIG. 5 presents a flowchart illustrating a method of a controller enabling the distribution of a piece of content in an enterprise environment, in accordance with an embodiment of the present application.

FIG. 5 presents a flowchart 500 illustrating a method of a controller enabling the distribution of a piece of content in an enterprise environment, in accordance with an embodiment of the present application. During operation, the controller determines a plan for distributing a piece of content (operation 502), as described in conjunction with FIG. 1C. The controller determines a set of devices that can operate as servers for the piece of content based on the plan (operation 504). The controller then sends a transfer start command comprising the file descriptor of the piece of content, a timeline for transfer, and a list of peers, if any, to the determined set of devices (operation 506). The controller determines a set of upstream devices for a respective peer (operation 508) and sends a transfer command to a respective peer with the corresponding upstream peers operating as servers for the piece of content (operation 510).

Figure 6A:
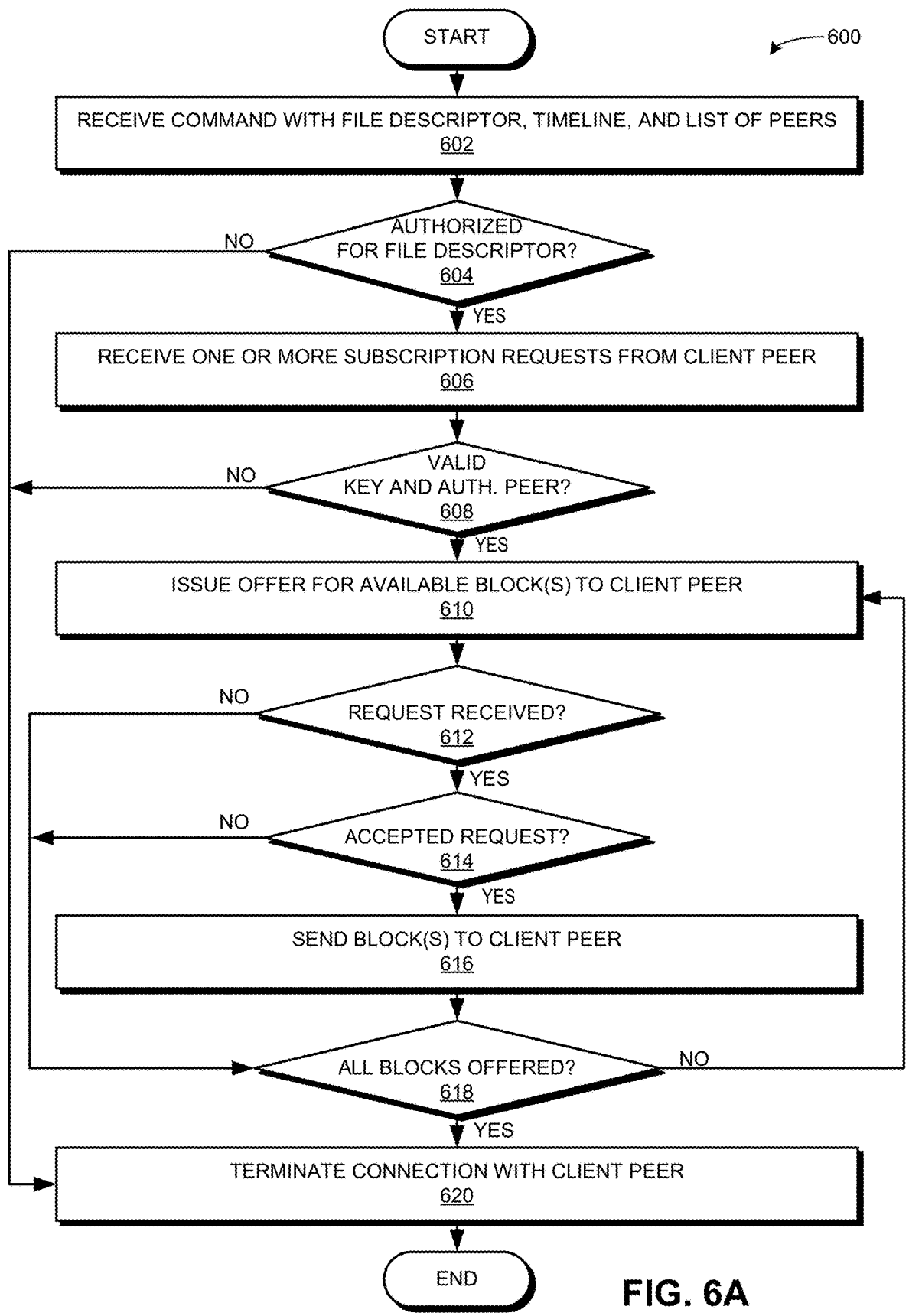
FIG. 6A presents a flowchart illustrating a method of a server peer providing a piece of content to a client peer, in accordance with an embodiment of the present application.

FIG. 6A presents a flowchart 600 illustrating a method of a server peer providing a piece of content to a client peer, in accordance with an embodiment of the present application. During operation, the server peer receives a command (e.g., a transfer start command) with a file descriptor, a timeline, and a list of peers (operation 602) and determines whether the peer is authorized for the file descriptor (operation 604). If authorized, the server peer can receive one or more subscription requests from a client peer (operation 606) and determine whether the client peer's key and authorization are valid (e.g., authorization for accessing the piece of content) (operation 608). If valid, the server peer issues an offer for the available block(s) to the client peer (operation 610).

The server peer then checks whether it has received a request (operation 612). Upon receiving a request, the server peer determines whether to accept the request (operation 614). If the server peer has accepted the request, the server peer sends the block(s) to the client peer (operation 616) and checks whether all blocks have been offered (operation 618). If all blocks have not been offered, the server peer continues to issue an offer for the available block(s) to the client peer (operation 610). This process allows the server peer to implement pipelining by offering a block as soon as the block becomes available. On the other hand, if the server peer is not authorized for the file descriptor (operation 604), the client peer's key and authorization are not valid (operation 608), or all blocks have been offered (operation 618), the server peer terminates the connection with the client peer (operation 620).

Figure 6B:
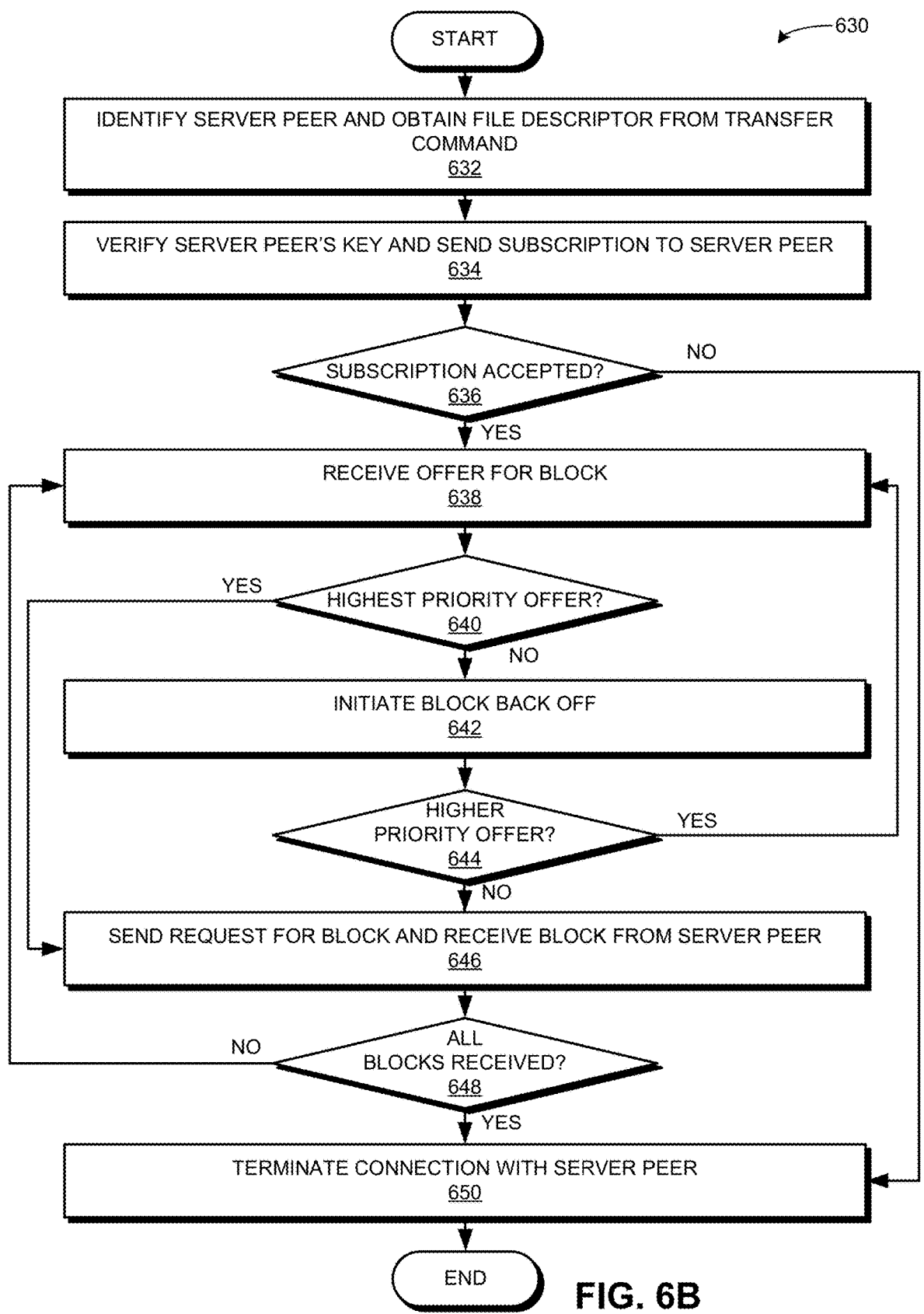
FIG. 6B presents a flowchart illustrating a method of a client peer obtaining a piece of content from an upstream server peer, in accordance with an embodiment of the present application.

FIG. 6B presents a flowchart 630 illustrating a method of a client peer obtaining a piece of content from an upstream server peer, in accordance with an embodiment of the present application. During operation, the client peer identifies the server peer and obtains the file descriptor from a transfer command (operation 632). The client peer then verifies the server peer's key and sends a subscription to the server peer (operation 634). If the subscription is accepted (operation 636), the client peer receives an offer for the block (operation 638). The client peer then checks whether the offer is the highest priority offer (operation 640). If the offer is not the highest priority offer, the client peer initiates a block back off (operation 642) and checks whether a higher priority offer is available (operation 644).

If a higher priority offer is available, the client peer receives the new offer (operation 638). On the other hand, if the offer is the highest priority offer (operation 640) or no higher priority offer is available (operation 644), the client peer can send a request for the block and receive the block from the server peer (operation 646). The client peer then checks whether all blocks have been received (operation 648). If all blocks have not been received, the client peer continues to receive an offer for additional block(s) from the server peer (operation 638). If the subscription is not accepted (operation 636), or all blocks have been received (operation 648), the client peer terminates the connection with the server peer (operation 650).

Figure 6C:
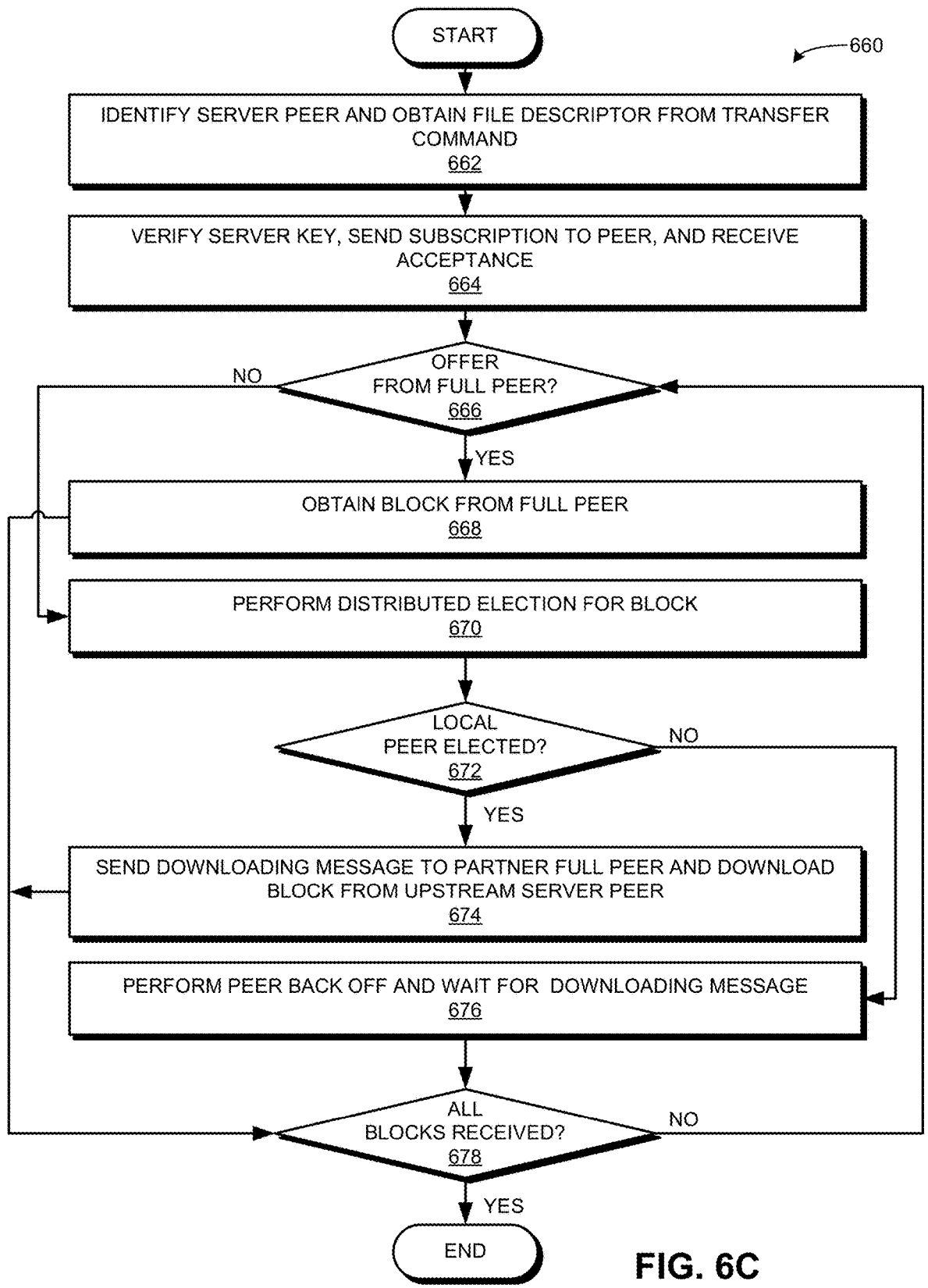
FIG. 6C presents a flowchart illustrating a method of a client peer receiving a piece of content from a full peer, in accordance with an embodiment of the present application.

FIG. 6C presents a flowchart 660 illustrating a method of a client peer receiving a piece of content from a full peer, in accordance with an embodiment of the present application. During operation, the client peer identifies the server peer and obtains the file descriptor from a transfer command (operation 662). The client peer then verifies the server peer's key, sends a subscription to the server peer, and receives an acceptance (operation 664). Subsequently, the client peer checks whether an offer is received from a full peer (operation 666). If an offer is received from the full peer, the client peer obtains the block from the full peer (operation 668).

If an offer is not received from the full peer, the client peer performs the distributed election for the block (operation 670) and checks whether the local peer has been elected (operation 672). If the local peer has been elected, the client peer sends a downloading message to the partner full peer and downloads the block from the upstream server peer (operation 674). If the local peer has not been elected, the client peer performs a peer back off and waits for the downloading message 676). Upon obtaining the block from a full peer (operation 668) or upstream server peer (operation 674), or performing the peer back off (operation 676), the peer checks whether all blocks have been received (operation 678). If all blocks have not been received, the peer continues to determine whether the peer has received an offer from the full peer (operation 666). Without facing an error or a failure, a full peer may not terminate its connection (e.g., an SSH connection) with its partner full peer.

Exemplary Computer System and Apparatus

Figure 7:
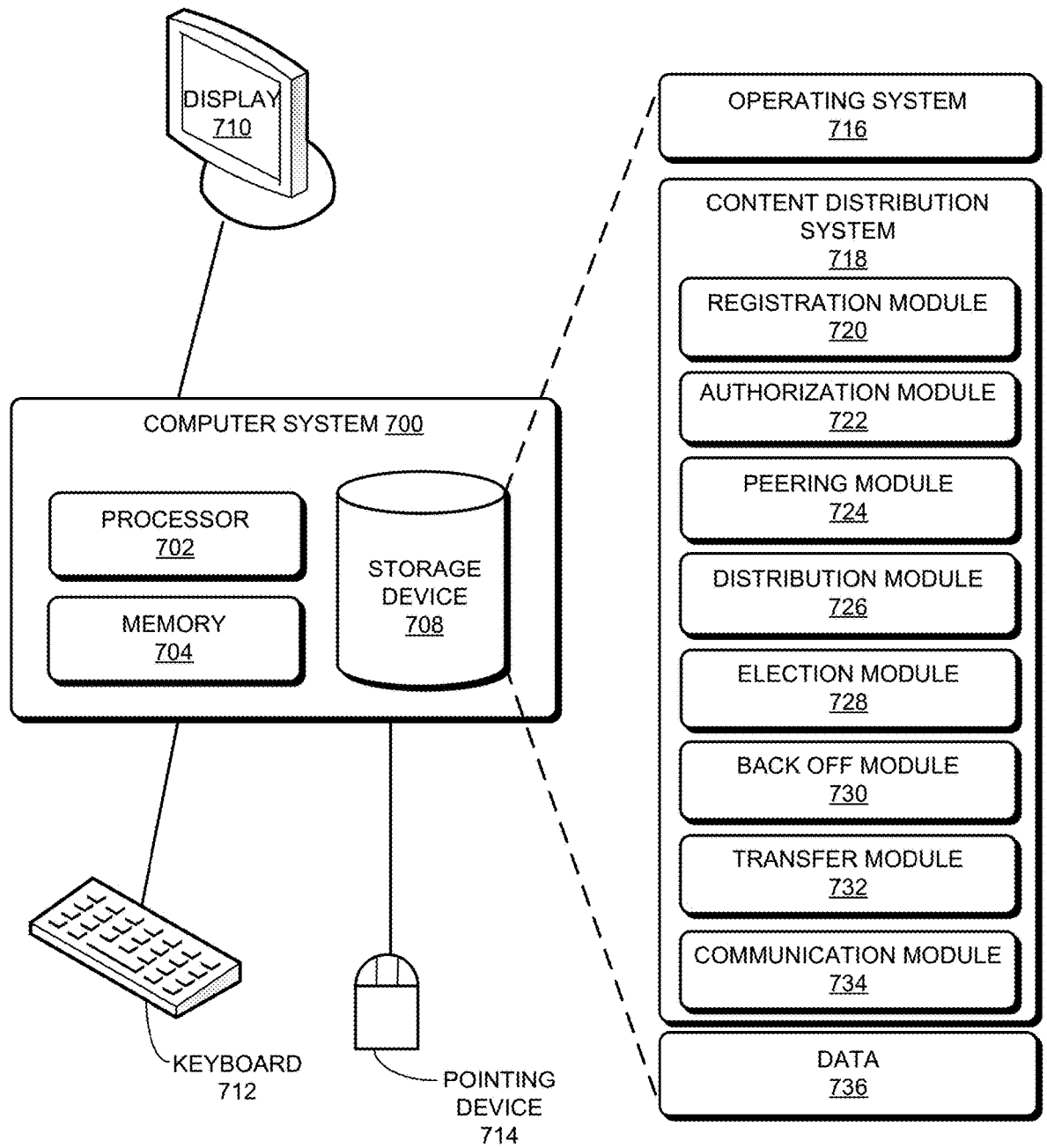
FIG. 7 illustrates an exemplary computer system that facilitates efficient content distribution in an enterprise environment, in accordance with an embodiment of the present application.

FIG. 7 illustrates an exemplary computer system that facilitates efficient content distribution in an enterprise environment, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a content distribution system 718, and data 736. Content distribution system 718 can facilitate the operations of one or more of: controller 140, source device peer 102, group heads 104, 106, 108, and 136, and devices 402, 404, 406, and 408.

Content distribution system 718 can include instructions, which when executed by computer system 700 can cause computer system 700 to perform methods and/or processes described in this disclosure. Specifically, content distribution system 718 can include instructions for discovering and maintaining information of a current set of devices and subnets in the enterprise environment in a node database (registration module 720). Content distribution system 718 can also include instructions for issuing, maintaining, and enforcing authorization of resources and operations within the enterprise environment based on an authorizations table (authorization module 722). Furthermore, content distribution system 718 can also include instructions for establishing and maintaining peer-to-peer relationships (e.g., configuring a priority value) (peering module 724).

Moreover, content distribution system 718 can also include instructions for initiating the distribution of a piece of content by issuing a transfer command (distribution module 726). Content distribution system 718 can include instructions for electing a peer for downloading a block of the piece of content from an upstream peer (election module 728). Content distribution system 718 can further include instructions for performing block and/or peer back off (back off module 730). Content distribution system 718 can further include instructions for executing block-based data transfer (e.g., issuing/acknowledging an offer, requesting based on an offer, responding to an offer, etc.) (transfer module 732). Content distribution system 718 may further include instructions for sending and receiving messages (communication module 734). Data 736 can include any data that can facilitate the operations of content distribution system 718.

Figure 8:
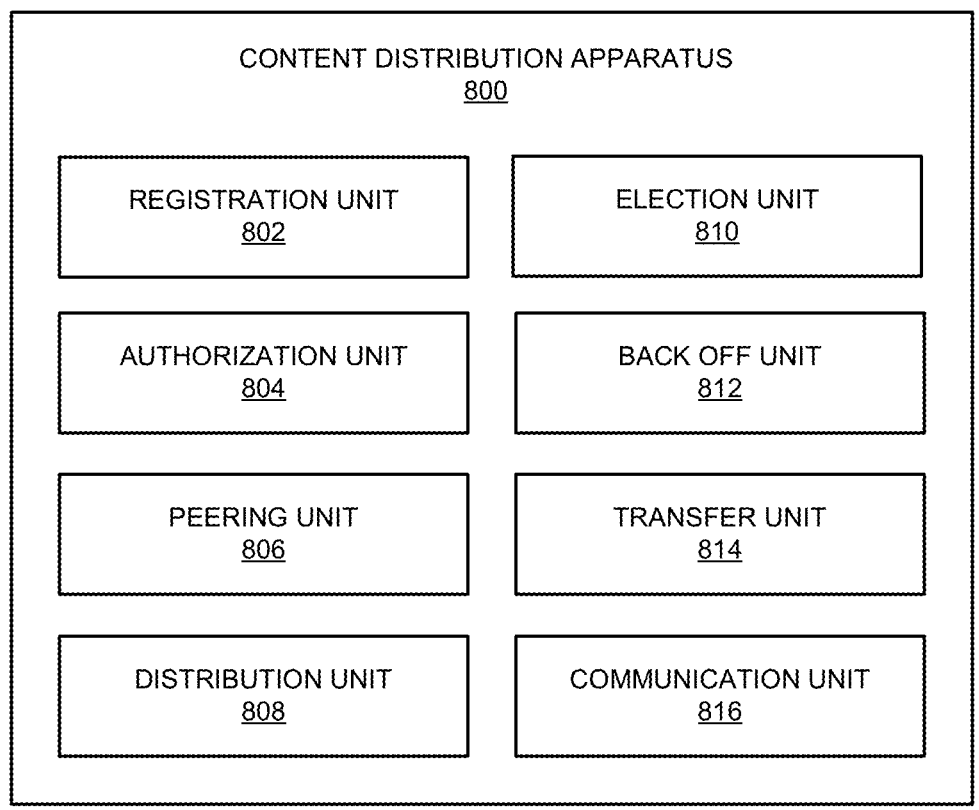
FIG. 8 illustrates an exemplary apparatus that facilitates efficient content distribution in an enterprise environment, in accordance with an embodiment of the present application.

FIG. 8 illustrates an exemplary apparatus that facilitates efficient content distribution in an enterprise environment, in accordance with an embodiment of the present application. Content distribution apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-816, which perform functions or operations similar to modules 720-734 of computer system 700 of FIG. 7, including: a registration unit 802; an authorization unit 804; a peering unit 806; a distribution unit 808; an election unit 810; a back off unit 812; a transfer unit 814; and a communication unit 816.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating dynamic content distribution in an enterprise environment, comprising:
   receiving, by a computing device from a controller of the enterprise environment, an instruction for downloading a piece of content from one or more peers of a peer-to-peer protocol, wherein the instruction comprises a file descriptor that indicates a set of blocks the piece of content is divided into;
   receiving an offer for a first block of the set of blocks from a first peer of the one or more peers;
   determining whether the computing device is in a full peer relationship with a second peer of the one or more peers, wherein the full peer relationship indicates that the second peer and the computing device are clients and servers of each other; and
   in response to determining that the computing device is in a full peer relationship, electing, between the second peer and the computing device, a sender for a first request that responds to the first offer.

2. The method of claim 1, further comprising sending a subscription request for the piece of content to the one or more peers based on the instruction.

3. The method of claim 1, wherein in response to determining that the computing device is not in a full peer relationship, the method further comprises:
   determining a first priority value associated with a peer relationship with the first peer; and
   in response to the first priority value being lower than a threshold, backing off from sending the first request for a predetermined period of time.

4. The method of claim 3, further comprising:
   determining whether a second offer for the first block from a third peer has been received within the predetermined period of time;
   determining whether a second priority value of the second offer is greater than the first priority value; and
   in response to the second priority value being greater than the first priority value, sending a second request that responds to the second offer.

5. The method of claim 4, wherein in response to not receiving the second offer or the second priority value not being greater than the first priority value, the method further comprises sending the first request.

6. The method of claim 1, wherein in response to the computing device being elected as the sender, the method further comprises:
   sending the first request to the first peer and sending a download notification message to the second peer; and
   receiving the first block from the first peer.

7. The method of claim 6, further comprising:
   sending a third offer for the first block to the second peer; and
   sending the first block to the second peer in response to receiving a third request that responds to the third offer.

8. The method of claim 1, wherein in response to the second peer being elected as the sender, the method further comprises waiting for a predetermined period of time for a download notification message from the second peer.

9. The method of claim 8, further comprising:
   receiving a fourth offer for the first block from the second peer; and
   sending a fourth request that responds to the fourth offer.

10. The method of claim 1, further comprising determining whether the first peer is authorized to send an offer for the first block based on the file descriptor and an authorizations table, wherein the authorizations table maintains permissions for operations and resources of the enterprise environment.

11. A non-transitory computer-readable storage medium storing instructions that when executed by a computer cause the computer to perform a method for facilitating dynamic content distribution in an enterprise environment, the method comprising:
    receiving, by a computing device from a controller of the enterprise environment, an instruction for downloading a piece of content from one or more peers of a peer-to-peer protocol, wherein the instruction comprises a file descriptor that indicates a set of blocks the piece of content is divided into;
    receiving an offer for a first block of the set of blocks from a first peer of the one or more peers;
    determining whether the computing device is in a full peer relationship with a second peer of the one or more peers, wherein the full peer relationship indicates that the second peer and the computing device are clients and servers of each other; and
    in response to determining that the computing device is in a full peer relationship, electing, between the second peer and the computing device, a sender for a first request that responds to the first offer.

12. The computer-readable storage medium of claim 11, wherein the method further comprises sending a subscription request for the piece of content to the one or more peers based on the instruction.

13. The computer-readable storage medium of claim 11, wherein in response to determining that the computing device is not in a full peer relationship, the method further comprises:
    determining a first priority value associated with a peer relationship with the first peer; and
    in response to the first priority value being lower than a threshold, backing off from sending the first request for a predetermined period of time.

14. The computer-readable storage medium of claim 13, wherein the method further comprises:
    determining whether a second offer for the first block from a third peer has been received within the predetermined period of time;
    determining whether a second priority value of the second offer is greater than the first priority value; and
    in response to the second priority value being greater than the first priority value, sending a second request that responds to the second offer.

15. The computer-readable storage medium of claim 14, wherein in response to not receiving the second offer or the second priority value not being greater than the first priority value, the method further comprises sending the first request.

16. The computer-readable storage medium of claim 11, wherein in response to the computing device being elected as the sender, the method further comprises:
    sending the first request to the first peer and sending a download notification message to the second peer; and
    receiving the first block from the first peer.

17. The computer-readable storage medium of claim 16, wherein the method further comprises:
    sending a third offer for the first block to the second peer; and
    sending the first block to the second peer in response to receiving a third request that responds to the third offer.

18. The computer-readable storage medium of claim 11, wherein in response to the second peer being elected as the sender, the method further comprises waiting for a predetermined period of time for a download notification message from the second peer.

19. The computer-readable storage medium of claim 18, wherein the method further comprises:
   receiving a fourth offer for the first block from the second peer; and
   sending a fourth request that responds to the fourth offer.

20. The computer-readable storage medium of claim 11, wherein the method further comprises determining whether the first peer is authorized to send an offer for the first block based on the file descriptor and an authorizations table, wherein the authorizations table maintains permissions for operations and resources of the enterprise environment.

* * * * *